United States Patent
Liang

(10) Patent No.: US 7,203,248 B1
(45) Date of Patent: Apr. 10, 2007

(54) IMPAIRMENT SENSITIVE SELECTION OF CONSTELLATION POINTS FOR COMMUNICATION ACROSS A CHANNEL

(75) Inventor: Haixiang Liang, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 662 days.

(21) Appl. No.: 09/627,571

(22) Filed: Jul. 28, 2000

Related U.S. Application Data

(60) Provisional application No. 60/146,780, filed on Jul. 31, 1999.

(51) Int. Cl.
   *H04L 27/36* (2006.01)
(52) U.S. Cl. ............ 375/298; 375/222; 375/242; 370/207
(58) Field of Classification Search ............ 375/298, 375/222, 227, 242, 295, 229, 231, 261, 279, 375/342, 308; 370/474, 523, 207; 341/106
See application file for complete search history.

(56) References Cited

U.S. PATENT DOCUMENTS

| | | | |
|---|---|---|---|
| 5,265,125 A * | 11/1993 | Ohta | 375/229 |
| 5,761,247 A | 6/1998 | Betts et al. | |
| 5,801,695 A | 9/1998 | Townshend | 375/340 |
| 5,809,075 A | 9/1998 | Townshend | 375/254 |
| 5,835,538 A | 11/1998 | Townshend | 375/295 |
| 5,852,630 A | 12/1998 | Langberg et al. | |
| 5,859,872 A | 1/1999 | Townshend | 375/242 |
| 5,864,545 A | 1/1999 | Gonikberg et al. | |
| 5,875,229 A | 2/1999 | Eyuboglu et al. | 379/1 |
| 5,970,103 A | 10/1999 | Townshend | 375/340 |

(Continued)

FOREIGN PATENT DOCUMENTS

WO    WO 98/17044    10/1997

(Continued)

OTHER PUBLICATIONS

U.S. Appl. No. 60/134,997.*

(Continued)

*Primary Examiner*—Jay K. Patel
*Assistant Examiner*—Ted M. Wang
(74) *Attorney, Agent, or Firm*—Sterne, Kessler, Goldstein & Fox PLLC

(57) ABSTRACT

An impairment compensation sequence for use in a communications system susceptible to one or more potential impairments each periodic in an integer number of symbols includes N phases, wherein N is selected such that each potential impairment, if present, is periodic therein, and a sequence of symbols, the sequence organized to place at least one instance of each symbol from a predetermined set of symbols in each phase to allow detection of the potential impairments in each of the N phases. The potential impairments may include robbed-bit signaling and padding. Using estimates prepared based on such an impairment compensation sequence, individual phase intervals may be grouped according to similarity of apparent aggregate effect of the impairments thereon without identification of individual impairments active in the particular phases. Constellation points may then be assigned based on group characteristics corresponding to phase intervals. In an exemplary realization, constellation points are assigned for each of 6 constellation indices based on amplitude estimates characteristic of the groups with which each of 4 corresponding phase intervals are associated.

36 Claims, 6 Drawing Sheets

U.S. PATENT DOCUMENTS

| | | | |
|---|---|---|---|
| 5,991,348 A | 11/1999 | Alelyunas et al. | |
| 5,999,109 A | 12/1999 | Norrell et al. | 341/58 |
| 6,104,730 A | 8/2000 | Marks | 370/523 |
| 6,108,354 A * | 8/2000 | Scull et al. | 370/523 |
| 6,115,395 A | 9/2000 | Norrell et al. | 370/523 |
| 6,118,813 A | 9/2000 | Lai | 375/231 |
| 6,272,171 B1 * | 8/2001 | Okunev et al. | 375/222 |
| 6,301,296 B1 * | 10/2001 | Krishnan et al. | 375/222 |
| 6,332,009 B2 | 12/2001 | Olafsson | |
| 6,512,787 B1 | 1/2003 | Tung et al. | |
| 6,661,847 B1 * | 12/2003 | Davis et al. | 375/242 |
| 6,721,279 B1 | 4/2004 | Zhang et al. | |
| 6,721,363 B1 | 4/2004 | Qiu et al. | |
| 6,724,814 B1 | 4/2004 | Green et al. | |

FOREIGN PATENT DOCUMENTS

| | | |
|---|---|---|
| WO | 98/45977 | 10/1998 |
| WO | WO 99/21288 | 10/1998 |
| WO | 99/12267 A2 | 3/1999 |
| WO | 99/34504 | 7/1999 |
| WO | 99/34566 | 7/1999 |
| WO | 99/37051 A2 | 7/1999 |
| WO | 99/38299 | 7/1999 |
| WO | 99/56156 A2 | 12/1999 |
| WO | 99/65156 | 12/1999 |

OTHER PUBLICATIONS

U.S. Appl. No. 60/140,705.*

U.S. Appl. No. 09/447,142, entitled "Deterministic Distortion Insensitive Adaptive Receiver Using Decision Updating," filed Nov. 23, 1999 by inventor Mark Gonikberg, 28 pages.

U.S. Appl. No. 09/627,572, entitled, "Categorization of Impairments Affecting a Communication Channel," filed Jul. 28, 2000, by inventor Haixiang Liang, 54 pages.

U.S. Appl. No. 09/627,573, entitled, "Impairment Compensation Sequence for Communication," filed Jul. 28, 2000, by inventor Haixiang Liang, 51 pages.

* cited by examiner

IMPAIRMENT SENSITIVE SELECTION OF CONSTELLATION POINTS FOR COMMUNICATION ACROSS A CHANNEL

This patent application claims benefit of U.S. Provisional Application No. 60/146,780, filed Jul. 31, 1999.

BACKGROUND OF THE INVENTION

1. Field of the Invention

The present invention relates to data communications, and more particularly, to digital impairment learning for pulse-code modulation (PCM) modems used in transmission paths compatible with digital modulation.

2. Description of the Related Art

Much of the public switched telecommunications network (PSTN) is implemented using digital data transport. Nonetheless, significant portions of the PSTN are still based on analog technology. For example, the "local loop" portion of PSTN that connects a telephone subscriber to a central office (CO) is typically an analog loop. Additionally, analog portions may exist at other points along a communications path, e.g., as an analog channel in an otherwise digital circuit.

To achieve high downstream data rates in the PSTN, the current generation of 56 Kbps modems no longer treat the communications path as an analog channel. Instead, such modems assume that there is only one (1) analog portion in a downstream transmission path from a digitally connected server modem to a client modem connected to an analog local loop. This configuration is reasonable in areas where most Internet Service Providers (ISPs) and business customers are digitally connected to the network and allows data signaling rates of up to 56 Kbps in the downstream transmission path.

Although a variety of similar designs are available, modems conforming to the ITU-T Recommendation V.90 are illustrative. See generally, ITU-T Recommendation V.90, *A Digital Modem and Analogue Modem Pair for Use on the Public Switched Telephone Network (PSTN) at Data Signalling Rates of up to* 56 000 *Bit/S Downstream and up to* 33 600 *Bit/S Upstream* (09/98) hereinafter referred to as "Recommendation V.90"), the entirety of which is incorporated by reference herein. Recommendation V.90 defines a method for signaling between a modem connected to an analog loop (the analog modem) and a modem connected to the digital trunk (the digital modem). Modems in accordance with Recommendation V.90 take advantage of this particular arrangement to increase the data rate from the digital modem to the analog modem.

Earlier generations of modems, e.g., those conforming to ITU-T Recommendation V.34 and/or earlier standards, suffered from quantization noise introduced in the conversion of analog signals to digital, Pulse Code Modulation (PCM) codewords for transmission in digital portions of the PSTN. Modem modems, including modems conforming to Recommendation V.90, avoid the effects of PCM quantization by using a form of amplitude modulation that allows voltage amplitude levels to be chosen from the quantization levels of the PCM coder/decoder (codec) in the CO. Recommendation V.90 matches the quantization levels to potentially eliminate quantization noise entirely in a downstream path from a server modem to a line interface. Thus, Recommendation V.90 achieves higher data rates when there are no analog-to-digital conversions between a V.90 digital modem and the PSTN. A digital V.90 modem transmits PCM codewords that are converted to discrete analog voltage levels in the local CO and are sent to the analog V.90 modem via the analog local loop. The analog modem's receiver then reconstructs the discrete network PCM codewords from the analog signals received.

There is no specific technique provided in Recommendation V.90 by which the analog client modem is to decide whether PCM signaling can be supported by the downstream channel. Rather, the client modem must make an inference about the condition of the channel during the training process. Moreover, part of the modem training procedure, defined in Recommendation V.90, includes estimating the digital impairments present on the telephone channel. Several common sources of digital impairments are Robbed Bit Signaling (RBS), transcoding (e.g., A-law to μ-law conversion), and digital attenuation pad.

Using current techniques, 56 Kbps downstream signaling rates can often be achieved. However, actual signaling rates may be limited by distortion introduced in the digital backbone itself. One source of distortion is Robbed Bit Signaling (RBS). RBS is an in-band signaling technique used in some portions of the PSTN to perform control functions such as conveyance of ring and call progress indications in the telephone network. In short, RBS involves modification by the PSTN of data transmitted. Generally, a least significant bit (LSB) of certain PCM codewords may be used (or usurped) by a portion of the digital backbone. Although usurpation of bits is generally acceptable when codewords carry a voice signal, RBS effectively acts as noise or distortion when codewords carry a data signal. Moreover, RBS limits the information carrying capacity of a communications channel that includes a portion employing it.

Recognizing these limitations, techniques have been developed for detecting, characterizing and mitigating RBS. For example, U.S. Pat. No. 5,875,229 to Eyuboglu et al., proposes detection and characterization of RBS during a "training" phase prior to other training operations such as initialization of equalizer coefficients. Eyuboglu's characterization technique is based on counting LSB values equal to logic zero and logic one in each of 24 intervals of a received training signal. U.S. Pat. No. 5,859,872 to Townshend also proposes a scheme for handling RBS in which RBS is detected during an initial training phase. In Townshend, a decoder first attempts to equalize a received training signal having a known pattern by minimizing the difference between its output and a known pattern under the assumption that no robbing of bits occurred. The decoder then measures the average equalized values at each of six phases and determines for each phase which of 4 bit robbing schemes (including no bit robbing) has been employed. Once the bit robbing that occurred in each phase is determined, the equalization process is rerun, since the first equalization was performed without knowledge of the bit robbing.

Recommendation V.90 specifies a protocol between digital and analog PCM modems, whereby a Digital Impairment Learning (DIL) sequence is supplied to allow the analog PCM modem to detect digital impairments in a communication path. In this way, the analog PCM modem may define a constellation (or constellations) that tend to avoid or compensate for the discovered impairments. The protocol defined in Recommendation V.90 allows each manufacturer to define a Digital Impairment Learning (DIL) sequence to meet its objectives.

SUMMARY OF THE INVENTION

Accordingly, a class of impairment compensation sequences and related techniques have been developed. In some realizations, impairment compensation sequences are intended to be requested and supplied as a DIL sequence in accordance with the protocols of Recommendation V.90. However, other similar realizations, e.g., based on proprietary or future protocols, as well as realizations without a formal or generic request/response protocol, are also envisioned and will be appreciated by persons of ordinary skill in the art based on the description herein.

In general, techniques in accordance with the present invention employing impairment compensation sequences accept the characteristics of each timing phase as presented and need not make a priori assumptions about RBS or other digital impairments in the communication channel. Accordingly, the impairment compensation sequences and related techniques are robust to digital impairments, including new digital impairments encountered in the field, that are periodic in N phases of the impairment compensation sequence as explained in greater detail herein. For example, in the case of RBS impairments, previous approaches have required knowledge of the RBS forms present in the telephone network. In contrast, 24-phase impairment compensation sequences in accordance with some embodiments of the present invention are indifferent to the particular form of RBS present, including overlaid contributions of various digital portions of a communications path, as long as all RBS is periodic in the 24 phases. Indeed, using complementary techniques described herein, impairment compensation may be achieved without identification of the specific RBS forms affecting a communications path.

Accordingly, realizations of communications apparatus and methods employing such impairment compensation sequences and/or related techniques generally do not require updated software or hardware if and when new impairments are encountered in the field or when used in a particular communication networks. For impairments periodic in a predetermined number of phases of an impairment compensation sequence (e.g., RBS-related impairments with periods of 6, 12, or 24 phases of a DIL sequence in accordance with the present invention), new types and/or combinations of impairments may be tolerated and communications facilities employing impairment compensation sequences and/or techniques in accordance with the present invention may conveniently adapt thereto.

In one embodiment in accordance with the present invention, a method of selecting points for inclusion in a multipoint constellation includes grouping phase intervals based on similarity of aggregate impairment exhibited therein, calculating a characteristic set of symbol estimates for each such group and assigning constellation points for a constellation index based on one or more characteristic sets corresponding thereto. The characteristic sets include contributions of symbol estimates from phase intervals associated with one or more other constellation indices. In one variation, the assigning is performed collectively for each of J distinct constellation indices and includes: selecting, for each such constellation index, successive candidate next constellation points that, based on symbol estimates for the one or more characteristic sets corresponding to the constellation index, satisfy a distance metric with respect to a last assigned constellation point for the constellation index, and assigning successive lowest power ones of the candidate next constellation points to respective constellations.

In another embodiment in accordance with the present invention, a method for mapping constellation points to one or more constellations is suitable for use in a communications system for communicating via a channel susceptible to one or more potential impairments each periodic in an integer N samples of a received signal. The method includes receiving a sequence of symbol estimates organized into N phases, where a respective one or more of the phases correspond to each of J constellation indices. The method further includes grouping the N phases into a set of characteristic groups according to aggregate effects of the periodic impairments, if any, present in the N phases and without a priori identification of individual forms of the periodic impairments present therein, and for each of the J constellation indices, selecting constellation points based on the characteristic groups associated with the one or more respective phases.

In yet another embodiment in accordance with the present invention, a communication device suitable for communicating, using one or more constellations, via a channel susceptible to one or more potential impairments each periodic in an integer N samples of a received signal, includes a receive path and an impairment compensator. The receive path is for receiving from the channel a sequence of symbols organized into N phases intervals, wherein respective ones of the phase intervals correspond to constellation indices. The impairment compensator is coupled into the receive path during a training mode to receive the sequence and group the N phases thereof into a set of characteristic groups according to aggregate effects of the periodic impairments, if any. The impairment compensator selects, for each of J constellation indices, constellation points based on the characteristic groups associated with the respective phase intervals corresponding thereto. In one variation, the characteristic groups associated with respective phase intervals corresponding to a particular constellation index include contributions of symbol receptions in grouped phase intervals corresponding to other constellation indices; such that selection of constellation points for the particular constellation index is improved by symbol receptions from substantially all phase intervals exhibiting similar aggregate effects of the periodic impairments. In another variation, the communication device further includes a transmit path, wherein the impairment compensator is coupled to the transmit path to supply an encoding of the selected constellation points to a remote communications device.

In still yet another embodiment in accordance with the present invention, an apparatus includes apparatus means for organizing a received sequence of symbol estimates into N phases, means for grouping the N phases into a set of characteristic groups according to correspondence of aggregate effects of periodic impairments, if any, present in the N phases, and means for selecting constellation points using symbol estimates characteristic of the grouped phases.

In still yet another embodiment in accordance with the present invention, a computer program product includes instructions executable on at least one processor to at least partially implement a communications device. The instructions include an impairment compensation subset thereof executable to group N phases of a symbol sequence received by the communications device into a set of characteristic groups according to correspondence of aggregate effects of periodic impairments, if any, present in the N phases, the impairment compensation subset of instructions selecting constellation points using symbol estimates characteristic of the grouped phases.

In some realizations, an impairment compensation sequence in accordance with the present invention is requested by an analog PCM modem using a DIL descriptor and supplied by a digital PCM modem as a DIL sequence all in accordance with phase 3 of a start-up sequence for modems that conform to ITU-T Recommendation V.90.

However, the techniques described herein are also applicable to other data communications configurations and equipment. These and other suitable configurations will be better appreciated by persons of ordinary skill in the art based on the specification that follows.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
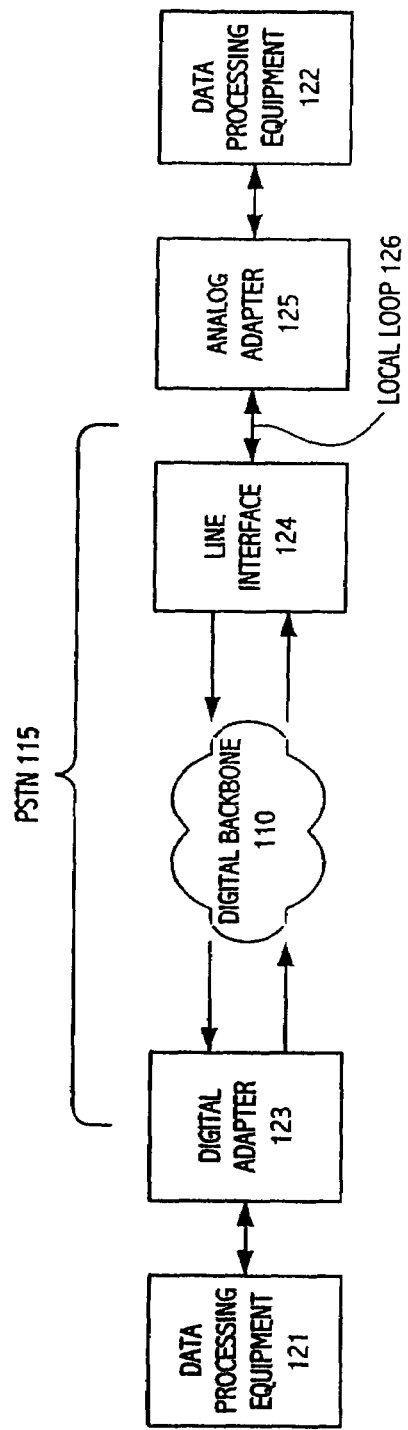
FIG. 1 is a generalized flow diagram illustrating a digital network including a public switched telephone network (PSTN) that employs robbed-bit signaling (RBS).

Although not limited thereto, some aspects of the present invention are described herein in the context of terminology, protocols, standards, facilities, encoding and modulation schemes, communication networks and/or interfaces typical of the Public Switched Telephone Network (PSTN). In particular, some aspects of the present invention are illustrated in the context of a digital Pulse Code Modulation (PCM) network, Robbed-Bit Signaling (RBS) typically employed in portions of the current PSTN, and modem realizations conforming to ITU-T Recommendation V.90 and related standards. Nonetheless, this context is merely illustrative. Indeed, based on the description herein, persons of ordinary skill in the art will appreciate realizations in accordance with the present invention suitable for other communication facilities and networks, including point-to-point circuits, private networks and communications channels generally susceptible to digital impairments.

Accordingly, and subject to the foregoing, the following nomenclature is presented for clarity in the description of certain illustrative embodiments particularly suitable in the context of a PSTN/V.90-oriented implementation framework:

GLOSSARY OF TERMS

| | |
|---|---|
| $A_{i,k}$ | estimate of the $i^{th}$ amplitude at the $k^{th}$ timing phase |
| $A'_{i,k}$ | an averaged version of $A_{i,k}$ |
| c | index used to point to a Uchord |
| $\phi$ | denotes the empty set |
| $\gamma_i$ | $i^{th}$ subset of $\Sigma$ consisting of all sets $\{\sigma_j\}$ that exhibit the same or similar aggregate impairments (e.g., from one or more RBS forms active in corresponding time indices) |
| $\Gamma$ | the set, $\{\gamma_0, \gamma_1, \ldots, \gamma_{M-1}\}$, of subsets of $\Sigma$ |
| $d(\sigma_i, \sigma_j)$ | sum of the amplitude differences-squared in the sets $\sigma_i$ and $\sigma_j$ (set difference) |
| DIL | Digital Impairment Learning sequence |
| $d_{min}$ | minimum distance parameter |
| $H_c$ | used to calculate the length of the DIL-segments containing training symbols from $Uchord_c$. |
| i | arbitrary integer index |
| j | arbitrary integer index |
| k | arbitrary integer index |
| $L_c$ | length of one DIL-segment |
| $L_{SP}$ | length of the sign pattern |
| $L_{TP}$ | length of the training pattern |
| l | arbitrary integer index |
| m | arbitrary integer index |
| M | the number of elements in $\Gamma$ |
| N | number of DIL-segments |
| r | arbitrary integer index |
| $REF_c$ | reference symbol in the DIL-segment containing training symbols from $Uchord_c$. |
| PCM | Pulse Code Modulation |
| $P_{max}$ | maximum power transmitted by digital modem |
| Ri | reference symbol at time index i |
| $s_m$ | number of elements in (i.e. the size of) the set $\gamma_m$ |
| SP | sign pattern |
| $\sigma'_i$ | a representative element of $\gamma_i$ |
| $\sigma_k$ | set of all estimated amplitudes at time index k |
| $\Sigma$ | $\{\sigma_k; k = 0, 1, \ldots, 23\}$ |
| Ti | training symbol at time index i |
| TP | training pattern |
| $\theta$ | threshold less than which a set difference is defined to be small |
| Ucode | A universal code used to refer to a symbol value whether encoded as a µ-law or an A-law PCM code word. |
| $Uchord_c$ | The $c^{th}$ subset of Ucodes. Ucodes are grouped into eight Uchords. $Uchord_1$ contains Ucodes 0 to 15; $Uchord_2$ contains Ucodes 16 to 31; ... ; and $Uchord_8$ contains Ucodes 112 to 127. |
| x(k) | denotes equalizer input sample at time index k |
| y(k) | denotes equalizer output sample at time index k |

Digital Impairments (including RBS) in the PSTN

A conventional network is shown in FIG. 1. Network 100 includes a digital network such as public switched telephone network (PSTN) 100 that includes a digital backbone 110. In the configuration shown, data processing equipment 121, such as an internet server or gateway thereto, communicates with a digital adapter 123, such as a digital V.90 modem, during data communications with data processing equipment 122, e.g., a user's computer. Digital adapter 123 transmits a sequence of symbols over digital backbone 110 to line interface 124. Line interface 124 in turn transmits baseband signals on local loop 126. Local loop 126 typically transmits voice signals or binary data in the form of baseband signals to analog adapter 125.

Analog adapter 125, e.g., an analog V.90 modem, receives the baseband signals and may, in turn, equalize and sample the baseband signal, detect the binary information in the demodulated signal and supply results to data processing equipment 122. A reverse path from analog adapter 125 to digital adapter 123 may be constructed using conventional analog modem signaling techniques, such as, for example, V.34 technology, or other suitable techniques. See generally, U.S. Pat. Nos. 5,875,229 and 5,859,872; see also Recommendation V.90 for a description of digital/analog modem pair technology.

Digital backbone 110 typically transmits encoded representations of symbol sequences. In an illustrative realization, symbols are encoded as A-law or μ-law pulse code modulation (PCM) codewords, each eight bits in length. Line interface 124 receives the encoded symbols from digital backbone 110 and an A-law or μ-law decoder prepares the symbols for transmission via local loop 126. In a typical realization, line interface 124 produces discrete baseband signals that correspond to inverse quantized symbols that are transmitted to analog adapter 125. Analog adapter 125 receives the baseband signals and obtains the transmitted data through signal processing techniques. Data processing equipment 122, in turn, receives the transmitted data from analog adapter 125.

In an illustrative communications network, digital backbone 110 is part of a PSTN that either employs robbed bit signaling (RBS) or exhibits other digital impairments. Such impairments typically introduce disturbances that have a very small effect on human perception of voice signals, but effectively act as noise or distortion when codewords encode data. Accordingly, digital impairments such as RBS limit the information carrying capacity of a communications channel. Focusing on an illustrative digital impairment, RBS is an in-band signaling technique used in some portions of the PSTN to perform control functions such as conveyance of ring and call progress indications in the telephone network. In portions of the PSTN employing the technique, RBS may result in modification of data transmitted. Generally, a least significant bit (LSB) of certain PCM codewords may be used (or usurped) by a portion of the digital backbone.

Figure 2:
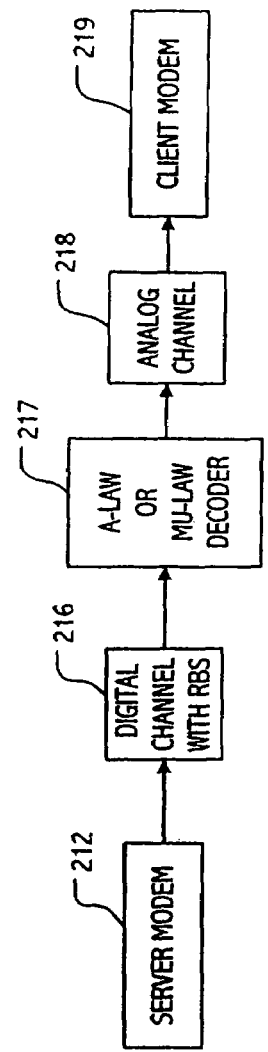
FIG. 2 illustrates a communications path for server and client modems showing a configuration in which RBS is present in a digital channel.

FIG. 2 illustrates a downstream communications path in which RBS is present in a digital channel 216. Server modem 212, e.g., a digital V.90 modem, generates a digital signal that forms an input to a decoder 217, e.g., an A-law or a μ-law decoder. At least some portion of digital channel 216 employs RBS, which "steals" certain low order bits of certain transmitted symbols to instead convey call progress or other indications. Persons of ordinary skill in the art will appreciate that individual portions of the digital channel 216 may each employ RBS affecting the same or different transmitted symbols, such that a conveyed sequence of symbols may be affected by multiple, possibly overlapping, RBS-type digital impairments. Decoder 217 converts the digitally encoded signals received from modem 212 via digital channel 216 and supplies a corresponding modulated analog signal via analog channel 218. Analog channel 218 conveys the modulated analog signal to client modem 219, e.g., an analog V.90 modem. Accordingly, the received signal may be affected by multiple, possibly overlapping, RBS-type digital impairments.

Figure 3A:
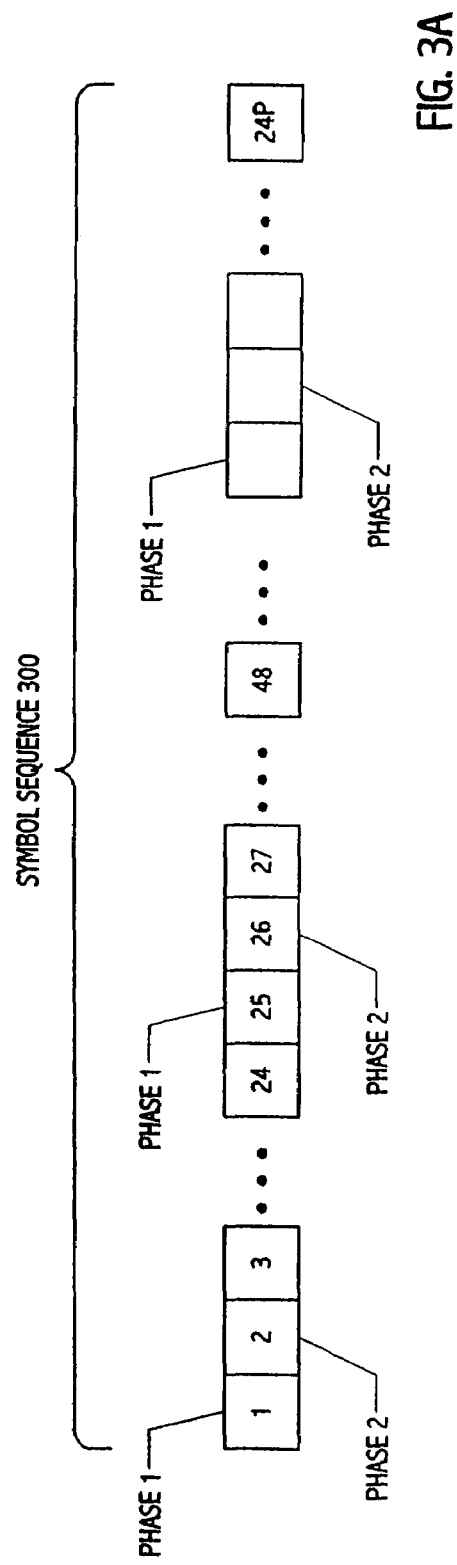
FIG. 3A is a diagram illustrating phases of a symbol sequence that may be transmitted over a communications path in accordance with an embodiment of the present invention.

FIG. 3A illustrates a symbol sequence 300 such as that transmitted by digital adapter 123 over digital backbone 110. Referring to FIGS. 2 and 3 in combination, some symbols, namely those PCM codewords transmitted in an interval affected by RBS, may be modified by digital channel 216. Typical sources of RBS tends to affect every sixth PCM codeword and, depending on the form employed, may force least significant bits (LSBs) of affected codewords to logic 1, to logic 0, or to logic 1 in some intervals and logic 0 in others. See generally, U.S. Pat. Nos. 5,875,229 and 5,859,872 for a discussion of RBS forms employed in the digital PSTN. Although a most basic period for RBS is six intervals, it has been observed that RBS, if employed, may exhibit a period of six, twelve or twenty-four. For example, an all-one RBS pattern will exhibit an RBS period of 6 phase intervals and an alternating zero-one pattern will exhibit an RBS period of 12. Other patterns, such as a pattern consisting of repetitions of 0 and an alternating 1/0 (e.g., 01000100 . . . ) will exhibit an RBS period of 24. See generally, TIA Draft Standard, TR30.3/00-05-0xx (DRAFT 15 PN3857), North American Telephone Network Transmission Model for Evaluating Analog Client and Digitally Connected Server Modems (May 2000) for a description of RBS patterns and related modem test procedures.

Therefore, for illustrative purposes, symbol sequence 300 can be viewed as exhibiting twenty-four timing phases, e.g., phase 1, phase 2, . . . phase 24. Of course, symbols transmitted in a given phase may be affected by multiple digital impairments, including multiple forms or sources of RBS. For example, in a digital channel including at least two portions, symbols transmitted in intervals corresponding to phase 2 (see FIG. 3A) may be affected by overlapping RBS contributions (or other digital impairment contributions) from each of the portions. Alternatively, RBS contributions (or other digital impairment contributions) may affect different phases. Whatever the overlap and phasing characteristics of the impairments, the resulting effects are guaranteed to be periodic in 24 intervals.

DIL Sequence Framework

The Digital Impairment Learning (DIL) framework specified by Recommendation V.90 may be employed in some realizations to allow an analog V.90 modem to request (and receive from a digital V.90 modem) an impairment compensation sequence in accordance with the present invention. In such realizations, the impairment compensation sequence can be encoded as a DIL sequence. Accordingly, certain aspects of the present invention may be best understood when described in the context of the DIL descriptor request/ sequence supply protocol specified by Recommendation V.90. Nonetheless, based on the description herein, persons of ordinary skill in the art will appreciate realizations in which (1) an alternative descriptor request/sequence supply protocol is employed or (2) no descriptor request/sequence supply protocol is employed. In general, impairment compensation sequences in accordance with the present invention may be requested, supplied, supplied without request, encoded, etc. in accordance with any suitable implementation framework. Subject to the forgoing, and without limitation, a realization particularly appropriate for the DIL framework of Recommendation V.90 is now described.

To facilitate compensation for digital impairments such as RBS, modem designs in accordance with Recommendation V.90, implement a digital impairment learning protocol that supports a wide variety of implementations techniques (often vendor specific techniques) for ascertaining, compensating and/or avoiding impairments present in a given communications channel. In some embodiments, equalizer and echo cancellation training (or retraining) at an analog V.90 modem may exploit a digital impairment learning (DIL) sequence transmitted by the digital V.90 modem. Typically, the DIL sequence is received and processed by the analog modem to determine the digital impairments present in the connection, for example, the digital PAD value, the RBS pattern, and nonlinear distortion.

In an illustrative realization, an impairment compensation sequence in accordance with the present invention is requested and supplied using the DIL framework of Recommendation V.90. Referring illustratively to FIG. 2, during a training phase of operation (e.g., phase 3 of the startup sequence defined by Recommendation V.90), analog client modem 219 requests a particular DIL sequence using a DIL sequence descriptor. The DIL sequence descriptor is sent from analog client modem 219 to digital modem 212. In response, digital modem 212 supplies a corresponding DIL via digital channel 216.

The specific requirements of Recommendation V.90 are well known (see generally, ITU-T Recommendation V.90, §§ 8.3, 9.3, which are incorporated herein by reference) and suitable implementations in accordance therewith will be appreciated by persons of ordinary skill in the art. However, to summarize operations in the context of FIG. 2, analog client modem 219 transmits a sequence requesting that digital modem 212 begin equalizer training. Analog client modem 219 then transmits a training signal, TRN. After training its receiver, digital modem 212 receives a sequence, $J_a$, from the analog client modem 219 and subsequently transmits a training signal, $TRN_{1d}$, for use by analog client modem 219 in its equalizer and/or echo cancellation training. In an exemplary realization in accordance with Recommendation V.90, the sequence, $J_a$, encodes a DIL descriptor. A suitable format for the DIL descriptor appears in ITU-T Recommendation V.90, § 8.3, Table 12, which is incorporated herein by reference. Digital modem 212 and analog client modem 219 subsequently exchange sequences, $J_d$ and $J_d'$, and signals, S and $\overline{S}$, whereupon digital modem 212 transmits a DIL sequence corresponding to the DIL descriptor.

DIL Sequence and Descriptor Formats

In some realizations in accordance with the present invention, an impairment compensation sequence is supplied as a DIL sequence and specified using parameters of a DIL descriptor supplied (e.g., by analog modem 219) in accordance with Recommendation V.90. In such realizations, the set of suitable impairment compensation sequences is constrained to a subset of all the possible sequences otherwise in accordance with the description and claims herein. In particular, the suitable subset is constrained by the DIL sequence organization specified by Recommendation V.90 and by the limited expressiveness of the DIL descriptor request format specified in Recommendation V.90. Persons of ordinary skill in the art will appreciate nature of these Recommendation V.90-related constraints based on the following description.

According to Recommendation V.90, a DIL sequence consists of N DIL-segments of length $L_c$ where:

$0 \leq N \leq 255$;

$1 \leq c \leq 8$; and $L_c = (H_c + 1) * 6$ symbols.

In the DIL scheme of Recommendation V.90, N, a set of N training symbols, a set of reference symbols, segment lengths, and a pattern of training and reference symbols (including a sign pattern) are all specified as part of the DIL descriptor.

In particular, each DIL segment in accordance with Recommendation V.90 includes a single training symbol (e.g., a Ucode) from the set specified in the DIL descriptor. Both a segment length and a reference symbol value may be individually specified for the set of Ucodes (and DIL segments) corresponding to a particular Uchord. For example, each $H_c$ specifies the length of the DIL-segments containing training symbols from the corresponding $Uchord_c$. Similarly, each $REF_c$ specifies the reference symbol for use in DIL-segments containing training symbols from the corresponding $Uchord_c$. A sign pattern (SP) and training pattern (TP) are used for the entire DIL sequence. The pattern of SP bits determines the pattern of sign for symbols of the DIL sequence. More particularly, values of 0 and 1 indicate negative and positive Ucode signs, respectively. Similarly, the pattern of TP bits determines the pattern of reference and training symbols in the DIL sequence. More particularly, values of 0 and 1 indicate a reference symbol ($REF_c$) and training symbol, respectively. Patterns are restarted at the beginning of each DIL-segment. The lengths of these patterns are:

$1 \leq L_{SP} \leq 128$; and $1 \leq L_{TP} \leq 128$.

Based on the description herein, DIL-descriptor formats and corresponding DIL sequences will be readily understood by persons of ordinary skill in the art familiar with Recommendation V.90. Accordingly, DIL-descriptors may be used to specify DIL sequence realizations of impairment compensation sequences in accordance with the claims that follow and provide a useful framework for description. Nonetheless, DIL sequence realizations are merely exemplary and impairment compensation sequences in accordance with the present invention need not comport with Recommendation V.90 or with a descriptor request/sequence supply protocol.

Impairment Compensation Sequences

In an exemplary embodiment in accordance with the present invention, an impairment compensation sequence may be employed to conform a communications device to at least a subset of impairments that may be present in a communications channel. For example, estimates (e.g., amplitude estimates) corresponding to training symbols (e.g., PCM code words) may be computed and adaptive signal processing structures (such as equalizers, echo cancellers, etc.) may be trained using a received impairment compensation sequence transmitted over the affected communications channel. In addition, symbol sets may be selected based on the characteristics of the received impairment compensation sequence.

In accordance with the present invention, an exemplary DIL-sequence described herein is designed in order to estimate the received amplitudes associated with all possible ucodes that could be transmitted by the remote modem. Further, the received amplitudes are observed at each of 24 possible time phases. The period of 24 is chosen to coincide with all possible periods of RBS sequences that might be employed on the digital channel. Actual RBS sequences have unknown periods of either 6, 12, or 24, so observing the received amplitudes at 24 distinct time phases subsumes all cases.

In particular realizations in accordance with the present invention, impairments that are periodic in N phases of a signal conveyed by the communications channel are addressed using impairment compensation sequences wherein at least one instance of each symbol is placed in each of the N phases thereof. An illustrative periodic impairment is RBS, which, in current communication systems, is periodic in 6, 12 or 24 symbol intervals of the PSTN. Accordingly, in an RBS-oriented embodiment, an impairment compensation sequence preferably presents each symbol that is, or may be, employed in communication via the affected communications channel in each of 24 phases of the impairment compensation sequence. In this way, estimates may be calculated for each symbol in each phase that may be affected by one or more RBS-type impairments. Since actual RBS impairments have periods that are not known a priori, but which must be 6, 12, or 24 symbol intervals, estimating corresponding amplitudes at each of 24 phases subsumes all cases.

In general, an impairment compensation sequence in accordance with the present invention includes N phases, wherein N is selected such that each potential impairment, if present, is periodic therein. According to an exemplary embodiment, N is 24, as in the maximum period for RBS. The impairment sequence is a sequence of symbols organized to place at least one instance of each symbol from a predetermined set of symbols in each time phase to allow detection of the potential impairments, such as RBS or PAD distortion, in each of the N phases. Another quality of the impairment compensation sequence is that N is chosen to be a least common multiple of respective periods of each of the potential impairments. Thus, the impairment compensation sequence establishes communication avoiding impairments that have any integer multiple, and is not limited to RBS and PAD-type periodic impairments.

Suitable realizations of such impairment compensation sequences are, in general, shaped by the characteristics of receiver signal processing structures and by limitations of (or constraints imposed by) any descriptor request/sequence supply protocol employed. For example, in a receiver that employs a particular equalizer design, e.g., a partial response, class five (PRV) equalizer, the organization of a suitable impairment compensation sequence typically allows individual training symbols to be isolated in equalizer output sequence. Similarly, in a descriptor request/sequence supply protocol (such as the DIL descriptor request/sequence supply protocol of Recommendation V.90) wherein a portions (e.g., segments) thereof each present a single training symbol, the organization of a suitable impairment compensation sequence typically presents at least one instance of a first training symbol (typically interspersed with reference symbols), then at least one instance of a second training symbol, then . . . , in each of the N phases of the impairment compensation sequence. In general, to improve the quality of estimation of symbols received, the impairment compensation sequence is organized to place at least two instances of each symbol from a predetermined set of symbols in each phase. The two or more instances can then provide an average of received values corresponding to the symbol.

Exemplary DIL Sequences

Based on the description and claims herein, persons of ordinary skill in the art will appreciate the general characteristics of impairment compensation sequences in accordance with the present invention in the context of a particular realization thereof. Accordingly, an impairment compensation sequence is now described which is embodied as an exemplary DIL sequence of symbols selected from the set of Ucodes employed in the PSTN, which is suitable for supply in response to a startup sequence in accordance with Recommendation V.90 and its descriptor request/sequence supply protocol, and which is particularly adapted for amplitude estimation at a communications device (e.g., an analog V.90 modem) implementation employing a PRV or partial-response, class four (PRIV) equalizer. While the exemplary DIL sequence is particularly suited to such a configuration, persons of ordinary skill in art will understand, based on the more general description herein, that the invention is not limited thereto.

Figure 3B:
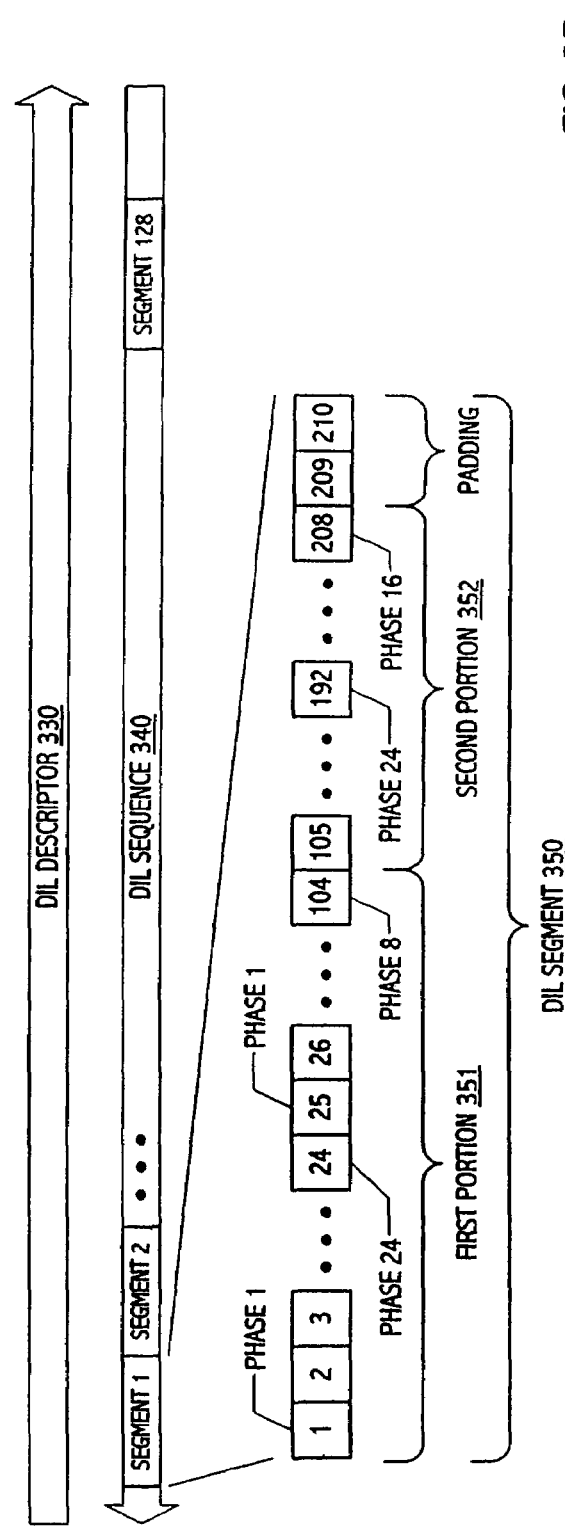
FIG. 3B is a diagram illustrating the organization of an illustrative impairment compensation sequence in accordance with the present invention as supplied as a DIL sequence using the DIL descriptor request and DIL segment supply framework of Recommendation V.90.

Referring to FIG. 3B and Table 1 below, a first portion 351 (104 symbols) of a DIL segment 350 of an exemplary DIL sequence 340 is illustrated. The complete DIL sequence is typically supplied in response to a DIL descriptor (e.g., DIL descriptor 330) that specifies the characteristics of the desired DIL sequence. Column 1 of the table indicates a time index k where a symbol is supplied at each time k={0,1,2, . . . 104, . . . }, while column 2 identifies each of 24 phases. For each time index, a symbol (e.g., a reference or training symbol) is supplied via a digital transport in which zero or more phases may be affected by zero or more RBS-type impairments. Each such symbol is received as a corresponding amplitude, x(k), which is supplied as an input to an equalizer of the receiver (e.g., a PRV or PRIV equalizer of a analog V.90 modem implementation). In the table, R represents instances a reference symbol and T represents a training symbol.

TABLE 1

DIL-Sequence

| | | | Equalizer Output [αy(k)] | |
|---|---|---|---|---|
| k | Phase | x(k) | PR V | PR IV |
| 0 | 0 | R | — | — |
| 1 | 1 | −R | — | — |
| 2 | 2 | T | — | — |
| 3 | 3 | −T | — | — |
| 4 | 4 | −R | T | T |
| 5 | 5 | R | −T | −T |
| 6 | 6 | −T | — | — |
| 7 | 7 | T | — | — |
| 8 | 8 | R | −T | −T |
| 9 | 9 | −R | T | T |
| 10 | 10 | T | — | — |
| 11 | 11 | −T | — | — |
| 12 | 12 | −R | T | T |
| 13 | 13 | R | −T | −T |
| 14 | 14 | −T | — | — |
| 15 | 15 | T | — | — |
| 16 | 16 | R | −T | −T |
| 17 | 17 | −R | T | T |
| 18 | 18 | T | — | — |
| 19 | 19 | −T | — | — |
| 20 | 20 | −R | T | T |
| 21 | 21 | R | −T | −T |
| 22 | 22 | −T | — | — |
| 23 | 23 | T | — | — |
| 24 | 0 | R | −T | −T |
| 25 | 1 | −R | T | T |
| 26 | 2 | R | — | — |
| 27 | 3 | −R | — | — |
| 28 | 4 | −T | — | — |
| 29 | 5 | T | — | — |
| 30 | 6 | −R | −T | −T |
| 31 | 7 | R | T | T |
| 32 | 8 | T | — | — |
| 33 | 9 | −T | — | — |
| 34 | 10 | R | T | T |
| 35 | 11 | −R | −T | −T |
| 36 | 12 | −T | — | — |
| 37 | 13 | T | — | — |
| 38 | 14 | −R | −T | −T |
| 39 | 15 | R | T | T |
| 40 | 16 | T | — | — |
| 41 | 17 | −T | — | — |
| 42 | 18 | R | T | T |
| 43 | 19 | −R | −T | −T |
| 44 | 20 | −T | — | — |
| 45 | 21 | T | — | — |
| 46 | 22 | −R | −T | −T |
| 47 | 23 | R | T | T |
| 48 | 0 | T | — | — |
| 49 | 1 | −T | — | — |
| 50 | 2 | R | T | T |
| 51 | 3 | −R | −T | −T |
| 52 | 4 | R | — | — |
| 53 | 5 | −R | — | — |
| 54 | 6 | T | — | — |

TABLE 1-continued

DIL-Sequence

| k | Phase | x(k) | Equalizer Output [αy(k)] PR V | PR IV |
|---|---|---|---|---|
| 55 | 7 | −T | — | — |
| 56 | 8 | −R | T | T |
| 57 | 9 | R | −T | −T |
| 58 | 10 | −T | — | — |
| 59 | 11 | T | — | — |
| 60 | 12 | R | −T | −T |
| 61 | 13 | −R | T | T |
| 62 | 14 | T | — | — |
| 63 | 15 | −T | — | — |
| 64 | 16 | −R | T | T |
| 65 | 17 | R | −T | −T |
| 66 | 18 | −T | — | — |
| 67 | 19 | T | — | — |
| 68 | 20 | R | −T | −T |
| 69 | 21 | −R | T | T |
| 70 | 22 | T | — | — |
| 71 | 23 | −T | — | — |
| 72 | 0 | −R | T | T |
| 73 | 1 | R | −T | −T |
| 74 | 2 | −T | — | — |
| 75 | 3 | T | — | — |
| 76 | 4 | R | −T | −T |
| 77 | 5 | −R | T | T |
| 78 | 6 | R | — | — |
| 79 | 7 | −R | — | — |
| 80 | 8 | −T | — | — |
| 81 | 9 | T | — | — |
| 82 | 10 | −R | −T | −T |
| 83 | 11 | R | T | T |
| 84 | 12 | T | — | — |
| 85 | 13 | −T | — | — |
| 86 | 14 | R | T | T |
| 87 | 15 | −R | −T | −T |
| 88 | 16 | −T | — | — |
| 89 | 17 | T | — | — |
| 90 | 18 | −R | −T | −T |
| 91 | 19 | R | T | T |
| 92 | 20 | T | — | — |
| 93 | 21 | −T | — | — |
| 94 | 22 | R | T | T |
| 95 | 23 | −R | −T | −T |
| 96 | 0 | −T | — | — |
| 97 | 1 | T | — | — |
| 98 | 2 | −R | −T | −T |
| 99 | 3 | R | T | T |
| 100 | 4 | T | — | — |
| 101 | 5 | −T | — | — |
| 102 | 6 | R | T | T |
| 103 | 7 | −R | −T | −T |
| ... | ... | ... | ... | ... |

A first portion of a DIL segment is illustrated in column 3 of the table. In particular, the organization of the first 104 symbols of an exemplary DIL segment is illustrated as a sequence of training and reference symbols. Corresponding amplitudes, x(k), are supplied as an input to an equalizer of the receiver. Column 4 illustrates idealized scaled outputs of a receiver employing a PRV equalizer wherein an output time sequence y(k) is related to the input time sequence x(k) by the relationship:

$$y(k)=x(k)-2x(k-2)+x(k-4).$$

Similarly, column 5 illustrates idealized scaled outputs of a receiver employing a PRIV equalizer wherein an output time sequence y(k) is related to the input time sequence x(k) by the relationship:

$$y(k)=x(k)-x(k-2).$$

In each case, interesting outputs, i.e., those that are a function of a single training symbol instance, are listed. Other outputs, indicated as "- - -" may be ignored. Note that in the case of outputs for the PR IV equalizer, only a single output based on each training symbol are illustrated. Duplicative outputs are ignored and the illustrated output is selected for correspondence with PRV outputs although other selections could also be made.

Inspection of the set of interesting equalizer outputs in Table 1 confirms that a training symbol appears once with a positive sign and once with a negative sign in each of the 24 possible time phases of the illustrated portion of a DIL segment. Each of these appearances corresponds to an estimate of the amplitude level of the training symbol when observed at the receiver. In an exemplary realization, a complete DIL segment (e.g., DIL segment 350) includes two repetitions (351 and 352) of the partial sequence illustrated in table 1 and therefore yields two such estimates, thereby reducing the error associated with each estimate by 3 dB, assuming that the errors are uncorrelated. In an exemplary realization, DIL sequence (e.g., DIL sequence 340) includes 128 similarly organized DIL segments, one for each possible (positive) Ucode employed in the PSTN (see Table 1/Recommendation V.90). In realizations in accordance with Recommendation V.90, each DIL segment presents a particular Ucode as the training symbol T.

Accordingly, a DIL sequence employing 128 such DIL segments presents each symbol (i.e., $A_i\{i=-127, -126, \ldots, -1, -0, 0, 1, \ldots, 127\}$) in each of the 24 possible time phases of the DIL sequence. Such a DIL sequence therefore provides 128 (Ucodes)×2 (positive and negative)×24 (timing phases)=6144 estimates, each of which includes the average of two observations of each of 256 amplitudes at each of the 24 timing phases. In the description that follows, an estimate of the $i^{th}$ amplitude at the $k^{th}$ timing phase is denoted by $A_{i,k}$ for $i=-127,-126, \ldots, -1, -0, 0, 1, \ldots, 127$ and $k=0, 1, \ldots, 23$. (Note that the elements $A_{-0,k}$ and $A_{0,k}$ are different in general.)

Exemplary DIL Descriptors

Although persons of ordinary skill in the art will appreciate a variety of impairment compensation sequences in accordance with the present invention, including sequences supplied without use of descriptor request/sequence supply protocols or using alternate protocols, realizations in accordance with the particular descriptor request/sequence supply protocols of Recommendation V.90 are illustrative.

As discussed above, an impairment compensation sequence that is a DIL sequence of reference (R) and training (T) symbols in accordance with Recommendation V.90, can be specified according to a logical combination of sign pattern bits (SP) and training pattern bits (TP). More specifically, a server modem responding in accordance Recommendation V.90 supplies reference and training symbols according to the sign pattern and the training pattern specified by a DIL descriptor. Typically, the particular symbol (reference or training) supplied at index j of a DIL segment is a function of corresponding SP and TP bit values:
  R if $SP_m=1$ and $TP_n=0$;
  −R if $SP_m=0$ and $TP_n=0$;
  T if $SP_m=1$ and $TP_n=1$; and
  −T if $SP_m=0$ and $TP_n=1$ where $j=0, \ldots, L_c-1$; $m=j \bmod L_{SP}$; and $n=j \bmod L_{TP}$. In the context of realizations in accordance with Recommendation V.90, a single training amplitude is supplied with positive and negative sign in the specified positions of a particular DIL segment. At least one DIL segment is requested for each training Ucode. Corresponding reference symbols for a group or Uchord of symbols are specified in accordance with the Recommendation V.90-style DIL descriptor format.

Accordingly, in a realization employing a Recommendation V.90-style DIL descriptor to request a DIL sequence of 128 DIL segments, each as illustrated above with reference to Table 1 and respectively corresponding to one of the 128 PCM encoded Ucodes employed in the digital PSTN, a suitable DIL descriptor encodes the following:

X=128;
$L_{SP}$=52; $L_{TP}$26;
SP={0xA5, 0xA5, 0xA5, 0xA5, 0xA5, 0xA5, 0x05};
TP {0xCC, 0xCC, 0xCC, 0x00};
$L_C$=210; $H_C$=34; and
$REF_C$=0; c=1,2, . . . 8.

The DIL segment length, $L_c$, is specified as 210, which includes two 104 symbol iterations of the partial DIL segment illustrated in Table 1 with an extra two bits of padding to provide a DIL segment length, $L_c$, that is a multiple of six. Sign pattern length, $L_{SP}$, and training pattern length, $L_{TP}$, are each selected to repeat evenly within the 208 symbol positions (210 less padding) of the DIL segment and provide two (2) positive sign instances and two (2) negative sign instances of a particular training Ucode in each of the 24 phases of the DIL segment.

While a complete set of available symbols may be employed in some realizations, a subset may be selected in accordance with power constraints of the system. More specifically, a specification such as Recommendation V.90, typically contemplates a limit to the amount of power transmitted across a communication channel. The PCM codeword includes Uchords that transmit at different power levels. Therefore, the set of symbols employed for communication (and included in a DIL sequence), may preferably be chosen to convey as much information as possible within power constraints. In another realization, the DIL sequence employs 112, rather than 128, Ucodes.

Determination of Characteristic Groups

Based on a received sequence such as the exemplary DIL-sequences described above, a communications device operating in accordance with some embodiments of the present invention groups phases according correspondence of respective estimates. For example, in some realizations, phases may be grouped by calculating a distance measure between phase-specific amplitude estimates of representative sets of symbols. An illustrative set difference calculation is described in greater detail below. Because the exemplary sequences described above guarantee that individual symbols of a predetermined set appear at least once in each phase, such difference measure calculations are facilitated.

Using distance measure calculations or other correspondence measurement techniques, phases affected by the same or like impairments can be identified and appropriate compensation can be applied to the group. It is notable that a receiver employing techniques such as described herein makes few a priori assumptions about the communications channel. For example, the receiver of an analog client modem employing such techniques (see e.g., FIG. 2 in which analog client modem 219 receives an impairment compensation sequence from digital server modem 212) need not make assumptions about which timing phases are perturbed by particular forms of RBS, padding or other artifacts of a digital communications channel. Instead, such techniques exploit the fact that the disturbance(s), if any, introduced by the digital network is periodic in a predetermined number of phases (typically 24). This assumption includes the common cases in which an RBS pattern exhibits a period of 6 or 12.

In the general case, each of the 24 phase intervals (see e.g., FIG. 3A) may, in theory, be affected by a different impairment or superimposed collection of impairments. Alternatively, each of the 24 phase intervals may be affected by a single impairment (or superimposed collection of impairments) or no impairment at all. Focusing illustratively on RBS impairments, presence of one or two distinct forms of RBS is common with less than all of the phase intervals affected. In general, the forms of RBS that may affect a phase interval result in: (1) forcing a least significant bit (LSB) of an octet to one; (2) forcing the LSB of an octet to zero; and (3) forcing the LSB of an octet to a "randomly" selected value, either a zero or a one. Note that selection of a zero or one is only "random" with respect to the symbols conveyed over the communications channel. Selection is, of course, deterministic from the point of view of the in-band signaling that employs it.

For simplicity, much of the art assumes that a given phase interval is affected by a single form of RBS, rather than a superposition of multiple forms. Similarly, it is often assumed that the single form of RBS affecting a particular sample is periodic in 6 phase intervals. Strictly speaking, neither simplification is necessarily valid. Instead, persons of ordinary skill in the art will recognize that individual portions of a communication channel may employ differing forms of RBS in various phase intervals. Accordingly, symbols conveyed over a communication channel in a given phase interval may be affected by multiple RBS forms or other impairments. Furthermore, as described above, the effects of RBS impairments may have periodicity of 12 or 24 phase intervals. Embodiments in accordance with the present invention may be particularly advantageous in that diagnosis of a particular RBS or other impairment is unnecessary. Whatever the particular forms of RBS active in a communications channel, realizations of the present invention may avoid diagnosis of the particular form(s) of RBS present in an individual phase interval by instead categorizing the phase intervals into characteristic groups according to the similarity of observed impairments.

Of course, in addition to RBS, other sources of impairments (such as digital attenuation padding) may also affect some or all of the phase intervals. Based on the description herein, persons of ordinary skill in the art will appreciate a wide variety of potential impairments and combinations of impairments that may affect the various phase intervals. Nonetheless, for clarity and without loss of generality, the description that follows focuses on RBS as the illustrative impairment.

Let the amplitude estimate for the $i^{th}$ symbol of a predetermined alphabet at the $k^{th}$ timing phase be denoted by $A_{i,k}$ for i=−127,−126, . . . ,−1,−0,0,1, . . . ,127 and k=0,1, . . . ,23. (Note that, in general, the elements $A^{-0,k}$ and $A_{0,k}$ stand for different estimates.) Further, define the sets $\sigma_k$={$A_{i,k}$; −127≦i≦127} for k=0,1, . . . ,23. That is, $\sigma_k$ is the set of all amplitude estimates made at timing phase k. Finally, define $\Sigma$={$\sigma_0,\sigma_1$, . . . ,$\sigma_{23}$}.

Based on the above, an illustrative set difference between $\sigma_i$ and $\sigma_j$, both elements of $\Sigma$, can be defined as:

$$d(\sigma_i, \sigma_j) = \sum_{l=-79}^{-48} (A_{l,i} - A_{l,j})^2 + \sum_{l=48}^{79} (A_{l,i} - A_{l,j})^2$$

where the range of index values l for the summation operators covers a representative subset of amplitude estimates (e.g., amplitude estimates for PCM code words corresponding to Uchord$_4$ and Uchord$_5$ as employed in modem communications in accordance with Table 1 of Recommendation V.90). Of course, the particular subset is merely illustrative and persons of ordinary skill in the art will recognize that any representative subset of transmitted symbols (including all the transmitted symbols) may be employed. Typically, impairment compensation sequences and constellations employed for data communication do not employ a complete set of symbols (e.g., all 256 signed Ucodes) based on power considerations.

Note that the above sum-of-squares set difference calculation is merely illustrative, and any of a variety of measures for establishing correspondence between phase-specific sets of estimates is suitable. For any suitable difference measure, a threshold or similar technique may be employed to discriminate between phases to be attributed to the same or different characteristic groups.

Based on the above, it is possible to define various subsets of $\Sigma$, $\Gamma = \{\gamma_0, \gamma_1, \ldots, \gamma_{M-1}\}$, with the properties that $$\bigcup_{i=0}^{M-1} \gamma_i = \Sigma$$

and $\gamma_i \cap \gamma_j = \phi$, $i \neq j$, where $\phi$ denotes the empty set. That is, $\gamma_m$ includes the set of amplitude estimates corresponding to phase intervals that can be associated with an $m^{th}$ characteristic group, where $m = 0, 1, \ldots M-1$ and $1 \leq M \leq 24$. Define $s_m$ to be the number of elements of $\gamma_m$. In general, a value of $M = 24$ corresponding to 24 characteristic groups each with a single corresponding phase interval ($s_m = 1$) may arise if each phase interval exhibits dissimilar impairment characteristics (e.g., 24 distinct RBS forms). More typically, a value such as $M = 3$ may arise if the 24 phase intervals can be associated with 3 dissimilar sets of impairment characteristics (e.g., 3 distinct RBS forms, including no RBS) wherein $$\sum_{m=0}^{2} s_m = 24.$$

To facilitate grouping of phase intervals into characteristic groups, it is possible, for each $\gamma_m$, to choose a representative set of amplitude estimates, $\sigma'_m$, such that $\sigma'_m \in \Sigma$, $\sigma'_m \in \gamma_m$ and $\sigma'_i \notin \gamma_m$ if $i \neq m$. In general, $\sigma'_m$ is any set of amplitude estimates that is representative of the $m^{th}$ characteristic group. In some realizations, $\sigma'_m$ is a composite (or average) of estimates from the various phase intervals that have been associated with the $m^{th}$ characteristic group.

Based on the above definitions, the following pseudocode illustrates a sequence of operations that may be implemented in a communication device (e.g., in software or firmware) for defining a set of characteristic groups and associating individual phase intervals with the characteristic groups.

```
Initial step:
    M=1
    γ₀={σ₀}
    σ'₀=σ₀
    s₀=1
General step:
    for k=1 to 23 {
        found = false
        for m=0 to M-1 {
            if (d(σ'ₘ,σₖ)< θ) {
                γₘ=γₘ∪{σₖ}
                sₘ=sₘ+1
                found = true
                break
            }
        }
        if !found {
            M=M+1
            γ_{M-1}={σₖ}
            σ'_{M-1}=σₖ
            s_{M-1}=1
        }
    }
``` where $\theta$ is any suitable threshold for discriminating between phase intervals exhibiting similar and dissimilar impairment characteristics (e.g., in one realization, $d(\sigma_i, \sigma_j)$ is small and $\sigma_i$ and $\sigma_j$ are to be grouped if $d(\sigma_i, \sigma_j) \leq \theta$). Note that use of a distance measure $d(\sigma_i, \sigma_j)$ such as the above-described sum-of-squares set difference calculation is merely illustrative and persons of ordinary skill in the art will appreciate a wide variety of suitable discrimination functions.

In some realizations, the threshold value, $\theta$, employed may be predetermined (e.g., empirically), while in others, the threshold value may be computed based on observed sets of estimates. In one such realization, a threshold may be established based on observed distance measures between the sets of amplitude estimates. For example, one such realization:

$$\theta = \alpha \min_{i,j}(d(\sigma_i, \sigma_j))$$

where $\alpha$ is selected to baseline the threshold off of a minimum distance between the sets of amplitude estimates. In one realization $\alpha = 3/2$.

While the above illustrated pseudocode groups a given phase interval with the first characteristic group for which a distance measure is below a threshold, it has been observed that such an implementation may not group a particular phase interval with those that best match its impairment characteristics. Accordingly, an improved realization (below) illustrates a sequence of operations that may be implemented in a communication device (e.g., in software or firmware) for defining a set of characteristic groups and associating individual phase intervals with the characteristic groups that better corresponds to observed impairment characteristics.

```
Initial step:
    M=1
    γ₀={σ₀}
    σ'₀=σ₀
    s₀=1
```

-continued

```
General step:
    for k=1 to 23 {
        MinDistance = d(σ'₀,σₖ)
        MinIndex = 0
        for m=1 to M-1 {
            distance = d(σ'ₘ,σₖ)
            if (distance < MinDistance) {
                MinDistance = distance
                MinIndex = m
            }
        }
        if (MinDistance < θ) {
            γ_MinIndex=γ_MinIndex∪{σₖ}
            s_MinIndex=s_MinIndex+1
        }
        else {
            M=M+1
            γ_{M-1}={σₖ}
            σ'_{M-1}=σₖ
            s_{M-1}=1
        }
    }
``` where each set of amplitude estimates, $\sigma_k$, for a particular phase interval is added to a characteristic group to which it best corresponds, $\gamma_{MinIndex}$, if the distance measure between that set of amplitude estimates and the characteristic group is less than a threshold. Otherwise, a new group is defined.

Figure 4:
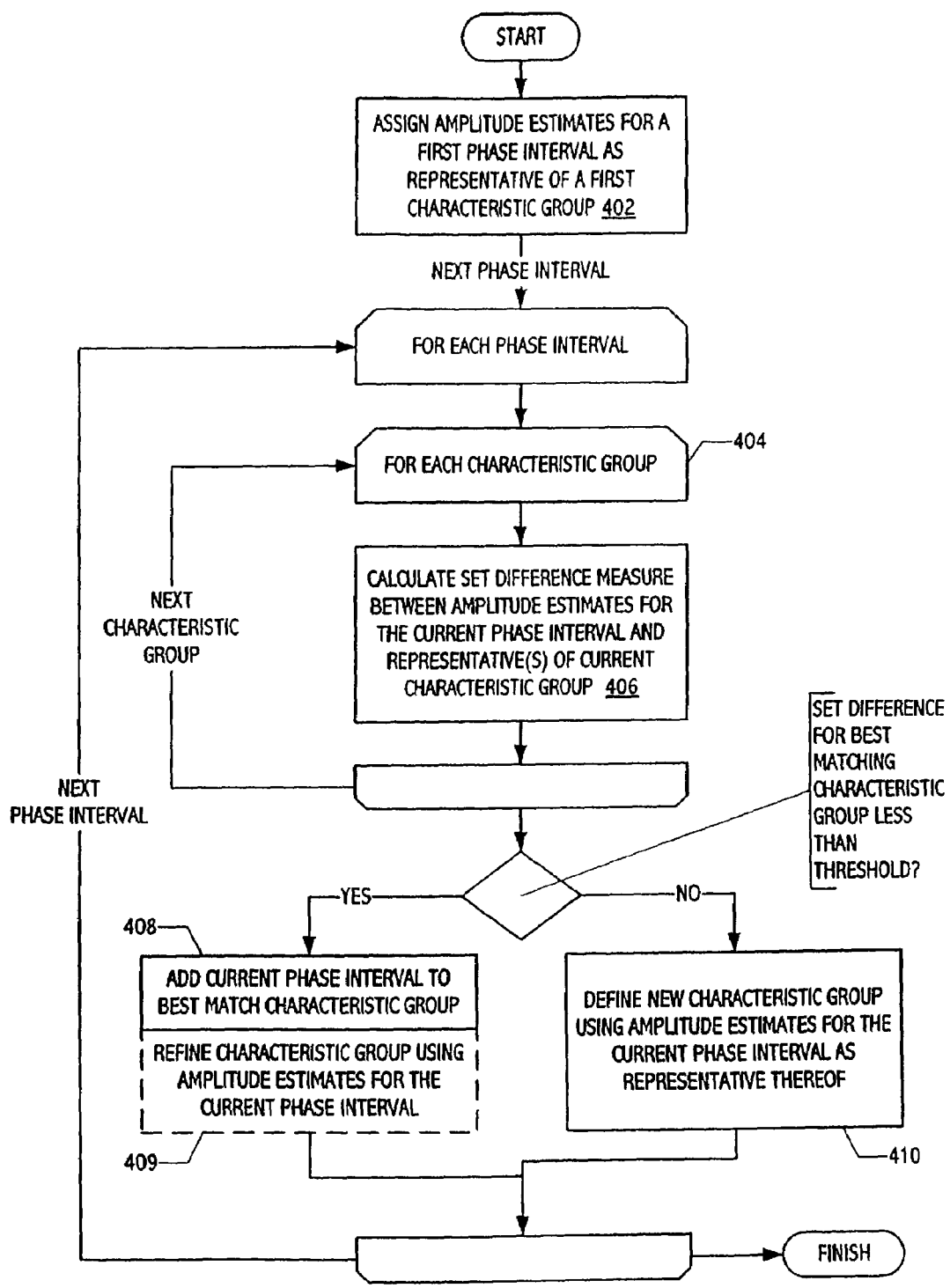
FIG. 4 is a flow diagram illustrating a method for grouping phase intervals according to similarity of aggregate impairments in accordance with an embodiment of the present invention.

While a variety of suitable implementations will be appreciated by persons of ordinary skill in the art based on the above descriptions and pseudocode, the flow chart of FIG. 4 illustrates one suitable sequence of operations. Initially, amplitude estimates for one of the 24 phase intervals are treated (402) as representatives of a first characteristic group. Typically, estimates for phase interval 1 are assigned to the first characteristic group, although the particular phase interval assigned is arbitrary. In general, phase interval 1 may be subject to RBS, padding or no periodic impairment at all. Next, amplitude estimates associated with another phase interval (typically, phase interval 2) are evaluated against then current characteristic groups. In the illustrative realization of FIG. 4, evaluation includes calculating (406) a set difference measure (such as described above) between amplitude estimates for the current phase interval (e.g., phase interval 2) and representatives of each characteristic group (e.g., group 1 characterized by amplitude estimates of phase interval 1). Based on comparison with each of the characteristic groups, a best matching characteristic group is identified. If the set difference measure meets a match criterion (e.g., if the set difference measure is below a threshold value), then the current phase interval may be added (408) to the matching characteristic group. If not, a new characteristic group is defined (410) using amplitude estimates of the current phase interval as representative thereof.

Focusing on an exemplary realization, assignment of a phase interval to a characteristic group may be based on use of a distance calculation that focuses on a representative subset of amplitude estimates. For example, in some realizations, estimates of symbols corresponding to Uchords four and five are employed. In one such realization, a set difference calculation is performed during a first pass through loop 404, comparing amplitude estimates $\sigma_2$ obtained in the second timing phase with a first group $\gamma_1$ characterized by amplitude estimates $\sigma'_1$ obtained in the first timing phase, and can be represented as follows:

$$d(\sigma_2, \sigma'_1) = \sum_{l=-79}^{-48} (A_{l,2} - A'_{l,1})^2 + \sum_{l=48}^{79} (A_{l,2} - A'_{l,1})^2$$

Later passes through loop 404 may include comparisons with larger numbers of then-defined characteristic groups.

The quality of amplitude estimates used to characterize individual groups can be improved by combining contributions from the various phase intervals that are assigned to the characteristic group. For example, in a characteristic group that includes two or more timing intervals, the set of amplitude estimates corresponding to the same codeword may be averaged or otherwise combined (e.g., using any suitable computational method) for each of the corresponding phase intervals. In an illustrative realization, an averaged value $A'_{i,m}$ for the $i^{th}$ amplitude estimate characteristic of the $m^{th}$ group may be calculated as follows:

```
for i=-127 to 127 (each amplitude estimate) {
    for m=0 to M-1 (each group) {
        A'_{i,m}=0
        for k=0 to 23 (each phase) {
            if (σₖ∈γₘ) {
                A'_{i,m}=A'_{i,m}+A_{i,k}
            }
        }
        A'_{i,m}=A'_{i,m}/sₘ
    }
}
``` where $\sigma'_m = \{A'_{i,m}; -127 \leq i \leq 127\}$, $0 \leq m \leq M-1$. Persons of ordinary skill in the art will appreciate that the above pseudocode is merely illustrative and that a particular implementation may employ similar techniques at any of a variety of points in a computation. For example, while some realizations may average amplitude estimates associated with a characteristic group after assignment of phase intervals to characteristic groups, others incrementally refine (see 409, FIG. 4) a representative set $\sigma'_m$ of amplitude estimates for each characteristic group using amplitude estimates from each assigned phase interval.

Assignment of Constellation Points

Based on a grouping of phase intervals, such as the exemplary set difference measure based grouping described above, a communications device operating in accordance with some embodiments of the present invention assigns constellation points based on the characteristics of grouped phases. For example, in some realizations, constellation points are assigned for each of several distinct constellation indices by selecting, for each such constellation index, successive candidate next constellation points that, based on symbol estimates for the one or more characteristic sets corresponding to the constellation index, satisfy a distance metric with respect to a last assigned constellation point for the constellation index. From such a set of candidates, successive lowest power candidates are assigned as next constellation points in respective constellations.

As before, realizations of the present invention may be better understood in the context of an illustrative embodiment in accordance with Recommendation V.90. Also as before, illustrative V.90 embodiments are not meant to be limiting. To the contrary, based thereon, persons of ordinary skill in the art will appreciate a variety of suitable realizations including those suitable for operation in the context of other standards, future standards and non-standard communication facilities or protocols.

Similarly, the preceding description identifies a particularly advantageous organization for an impairment compensation sequence (sometimes encoded as a Digital Impairment Learning (DIL) sequence in accordance with Recommendation V.90) and related techniques for grouping phase intervals based on correspondence of apparent aggregate impairments. While grouping of phase intervals based on estimates of received symbols corresponding to a 24 phase DIL sequence with characteristics such as described above is preferable, other methods of grouping may be employed as a precursor to the assignment of constellation points now described. For example, in one realization grouping is based on a 6 phase view of received sequences such that there is a one-to-one correspondence between phase intervals and constellation indices. These and other variations will be appreciated by persons of ordinary skill in the art based the description that follows.

In view of the foregoing, an illustrative V.90-oriented embodiment is now described. Recommendation V.90 provides for six sets of constellation points, one for each of six timing instants (or constellation indices) from 0 to 5. As described above, one particularly advantageous view of a DIL sequence is as a 24-phase symbol sequence, wherein a variety of potential impairments are known to be periodic at least in 24 phase intervals (if not 6 or 12 phase intervals). In such an illustrative framework, a $k^{th}$ constellation index corresponds to four phase intervals k, k+6, k+12 and k+18. Accordingly, in realizations that employ a 24-phase view of symbol sequences, group associations for each of the corresponding four phase intervals may be employed in the assignment of successive constellation points for a given constellation index. Of course, in general, actual groupings are dependent on the particular impairment characteristics of a communication channel. Accordingly, based on the particular impairments active in particular timing phases of a particular communications channel, the four phase intervals corresponding to a particular constellation index may be associated with 1, 2, 3 or 4 groups.

In a simplified realization, two general cases need to be considered. In the first case, each of the phase intervals corresponding to a constellation index is associated with a same characteristic group. In mathematical terms, each of the phase intervals is associated with set of amplitude estimates characteristic of group $\gamma_m$, i.e., $\sigma_k \epsilon \gamma_m, \sigma_{k+6} \epsilon \gamma_m, \sigma_{k+12} \epsilon \gamma_m$, and $\sigma_{k+18} \epsilon \gamma_m$ for some m. In this case, the set of symbol estimates $\sigma'_m = \{A'_{i,m}; -127 \leq i \leq 127\}$ can be used for selection of constellation points as follows: Let $i_l$ be the smallest positive value of i such that $A'_{i,m} - A'_{-i,m} \geq d_{min}$. For $r \geq 2$, let $i_r$ be the smallest positive value of i such that $A'_{i,m} - A'_{i_{r-1},m} \geq d_{min}$ and $A'_{-i_{r-1},m} - A'_{-i,m} \geq d_{min}$. Continue this process for r=3,4, . . . as long as the constellation power (e.g., as defined in Clause 8.5.2 of Recommendation V.90) does not exceed the maximum average power ($P_{max}$) or until all the points in the set $\sigma'_m$ (i.e., points corresponding to $0 \leq i \leq 127$) have been exhausted. The resulting set $\{i_1, i_2, \ldots, i_r\}$ defines the constellation for constellation index k.

In the second case, the corresponding phase intervals are not all associated with the same characteristic group. Instead, the phase intervals may be associated with two, three or four characteristic groups. For example, in the case of $\sigma_k \epsilon \gamma_{m_1}, \sigma_{k+6} \epsilon \gamma_{m_2}, \sigma_{k+12} \epsilon \gamma_{m_3}$, and $\sigma_{k+18} \epsilon \gamma_{m_4}$ where $m_1, m_2, m_3, m_4$ are not all equal, the sets of symbol estimates $\sigma'_{m_1}, \sigma'_{m_2}, \sigma'_{m_3}$, and $\sigma'_{m_4}$ are used as follows for selection of constellation points for constellation index k: Let $i_1$ be the smallest positive value of i for which symbol estimates $A'_{i,m_t} - A'_{-i,m_t} \geq d_{min}$ for every $l \epsilon \{1,2,3,4\}$. For $r \geq 2$, let $i_r$ be the smallest positive value of i such that: $\min\{(A'_{i,m_t} - A'_{i_{r-1},m_t}), (A'_{-i_{r-1},m_t} - A'_{-i,m_t})\} \geq d_{min}$ for every $l \epsilon \{1,2,3,4\}$. Continue this process for r=3,4, . . . as long as the constellation power does not exceed $P_{max}$ or until all the points in the set corresponding to $0 \leq i \leq 127$ have been exhausted. The resulting set $\{(i_1, i_2, \ldots, i_r\}$ defines the constellation for constellation index k.

Note that the final constellation is typically subject to additional manipulation that is somewhat independent of the techniques described herein. In particular, legal regulations prohibit modems from transmitting at a power level that is greater than a specified maximum. This restriction sometimes leads to creation of a constellation for which addition of an additional point would exceed the maximum power, but such that using the derived set of points fails to use all of the power available. In that instance the distance between the points in the resulting set can be increased in order to improve performance. Therefore, in practice an additional iteration can be performed on the set of constellation points obtained by following the above procedure. This iteration can be applied in addition to the steps described above.

Figure 5:
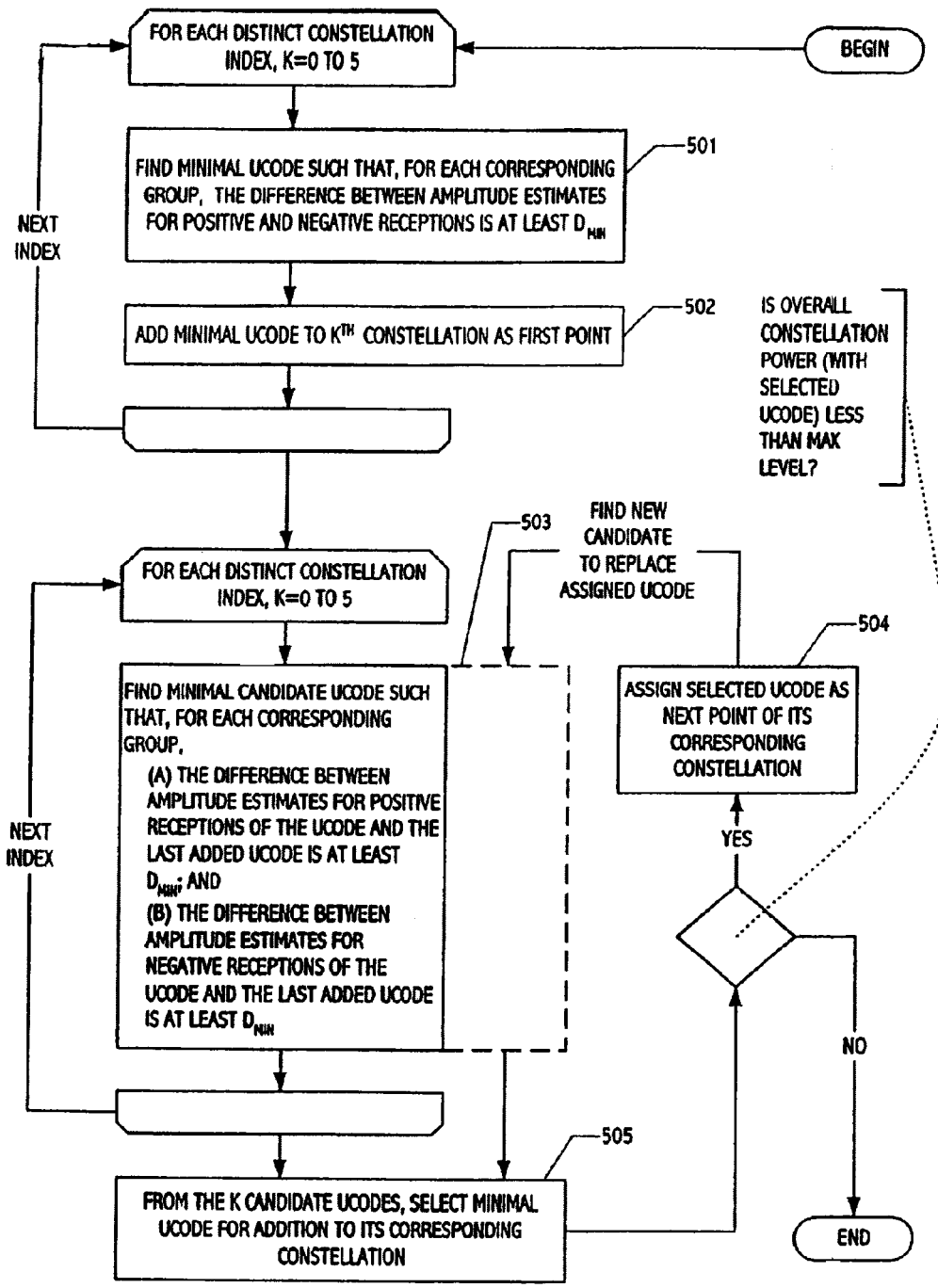
FIG. 5 is a flow diagram illustrating a method for assigning constellation points in accordance with an embodiment of the present invention.

Building on the above, some additional realizations are notable. For example, FIG. 5 illustrates a variation in which constellation points are assigned to constellations for each of 6 constellation indices in a manner that advantageously utilizes overall constellation power (i.e., power collectively employed by a statistical distribution of information transmitted in phase intervals corresponding to each of the constellation indices) to maximize information capacity. As before, an initial point is selected for each of 6 constellations. In particular, a minimal Ucode is selected (501) such that, for each corresponding group (e.g., in an exemplary embodiment, the 1, 2, 3 or 4 groups associated with the four phase intervals corresponding to a given constellation index), the difference between amplitude estimates for positive and negative receptions of the Ucode is at least $d_{min}$. Generally, the $d_{min}$ parameter relates to an estimated signal-to-noise ratio on the telephone line and determines the minimum spacing between constellation points consistent with a given level of performance. Additionally, legal regulations prohibit modems from transmitting at certain power levels. Recommendation V.90 defines this restriction, which is hereinafter referred to as maximum power level, $P_{max}$.

Note that in the Ucode set defined by Table 1 of Recommendation V.90, Ucodes are organized in order of increasing power. Accordingly, in an illustrative V.90 realization, a minimal Ucode is a lowest number Ucode that meets the $d_{min}$ criterion. For each of the 6 constellations such a minimal Ucode is identified and added (502) as a first constellation point. Persons of ordinary skill in the art will appreciate suitable interpretations for other coding schemes.

Successive constellation points are added to the 6 constellations as follows. For each of the K constellation indices, a minimal candidate Ucode is identified based on evaluation of a minimum spacing criterion in the context of amplitude estimates from the characteristic group (or groups) corresponding thereto. In an exemplary realization, the minimum spacing criterion is based on the difference between a group-specific amplitude estimate and the Ucode last added to a current constellation exceeding $d_{min}$. Then, a minimal one of the 6 minimal candidates is selected for addition to its corresponding constellation.

For example, assume that based on an evaluation (503) of the $d_{min}$ criterion in the context of two characteristic groups $\gamma_1$ and $\gamma_2$ of amplitude estimates associated with phase intervals 4, 10, 16, and 22 corresponding to a $4^{th}$ constellation index, $Ucode_{22}$ is the minimal Ucode for which estimates from both groups exceed the Ucode last added to constellation 4 by at least $d_{min}$. Further assume that the similarly calculated (503) minimal candidates for the $0^{th}$, $1^{st}$, $2^{nd}$, $3^{rd}$ and $5^{th}$ constellation indices are $Ucode_{23}$, $Ucode_{24}$, $Ucode_{24}$, $Ucode_{23}$ and $Ucode_{24}$, respectively based on the aggregate impairments observed in each of the phase intervals corresponding thereto (i.e., based comparison of the amplitude estimates for the corresponding characteristic groups with respective last added constellation points). Based on the foregoing, $Ucode_{22}$ is selected (505) as the minimal one of the candidate Ucodes and is added (504) to the corresponding constellation (i.e., constellation 4). A next candidate is calculated (503) for the $4^{th}$ constellation index and a minimal one of the then current candidates is again selected for addition to its corresponding constellation. For example, assuming that the next candidate for the $4^{th}$ constellation index is $Ucode_{24}$, a minimal candidate ($Ucode_{23}$) is added to constellation 0. The process continues until a selected candidate would, if added, cause overall constellation power to exceed a maximum level, e.g., $P_{max}$.

While the above description has assumed that all 6 constellation indices are distinct, this need not be the case. Indeed, performance advantages may be achieved if constellation assignment calculations are not duplicated for indistinct indices. For example, based on the description herein, persons of ordinary skill in the art will appreciate that if the set of characteristic groups associated with corresponding phase intervals of two or more constellation indices are the same (i.e., the two or more constellation indices are indistinct), then selections performed for one constellation index may be used in each of the others.

Resulting constellations may be transmitted to a remote communications device, e.g., to a remove V.90 server modem, using any suitable mechanism. For example, after an analog client modem operating in accordance with an embodiment of the present invention receives a DIL sequence, groups phases and assigns constellation points as described above, it may transmit an encoding of the resulting constellations back to a digital server modem. In one such realization, at least the assignment of constellation points is performed during the Phase 4—Final Training period defined by Recommendation V.90. Constellation parameter transfer protocols and mechanisms such as that defined by Recommendation V.90 are well known and realizations in accordance with the present invention may use any transfer mechanism suitable for the communications devices and/or communications channels employed.

Exemplary Communication Systems and Device Embodiments

A typical communications system in accordance with the present invention includes a receiver (typically including an equalizer) to receive an impairment compensation sequence such as described above. Typically, such a receiver is provided as part of a communications device such as an analog V.90 modem, although other realizations will be appreciated by persons of ordinary skill in the art based on the description herein. In some realizations, characteristic groups are determined and impairment sensitive selection of constellation points is performed based on the received impairment compensation sequence. In general, suitable impairment compensation sequences are selected in accordance with the particular signal processing structures employed by the receiver. For example, some of the description above emphasized impairment compensation sequences suitable for a receiver employing a partial-response IV equalizer (PRIV) or partial-response V equalizer (PRV). While not limited thereto, suitable realizations may be understood in the context of particular communications system and device configurations (including modems conforming to Recommendation V.90) employing a partial response class V (PRV) equalizer structure such as described in greater detail in U.S. patent application Ser. No. 09/249,990, filed on Feb. 13, 1999, entitled "Efficient Reduced State Maximum Likelihood Sequence Estimator," now U.S. Pat. No. 6,618,451.

Figure 6:
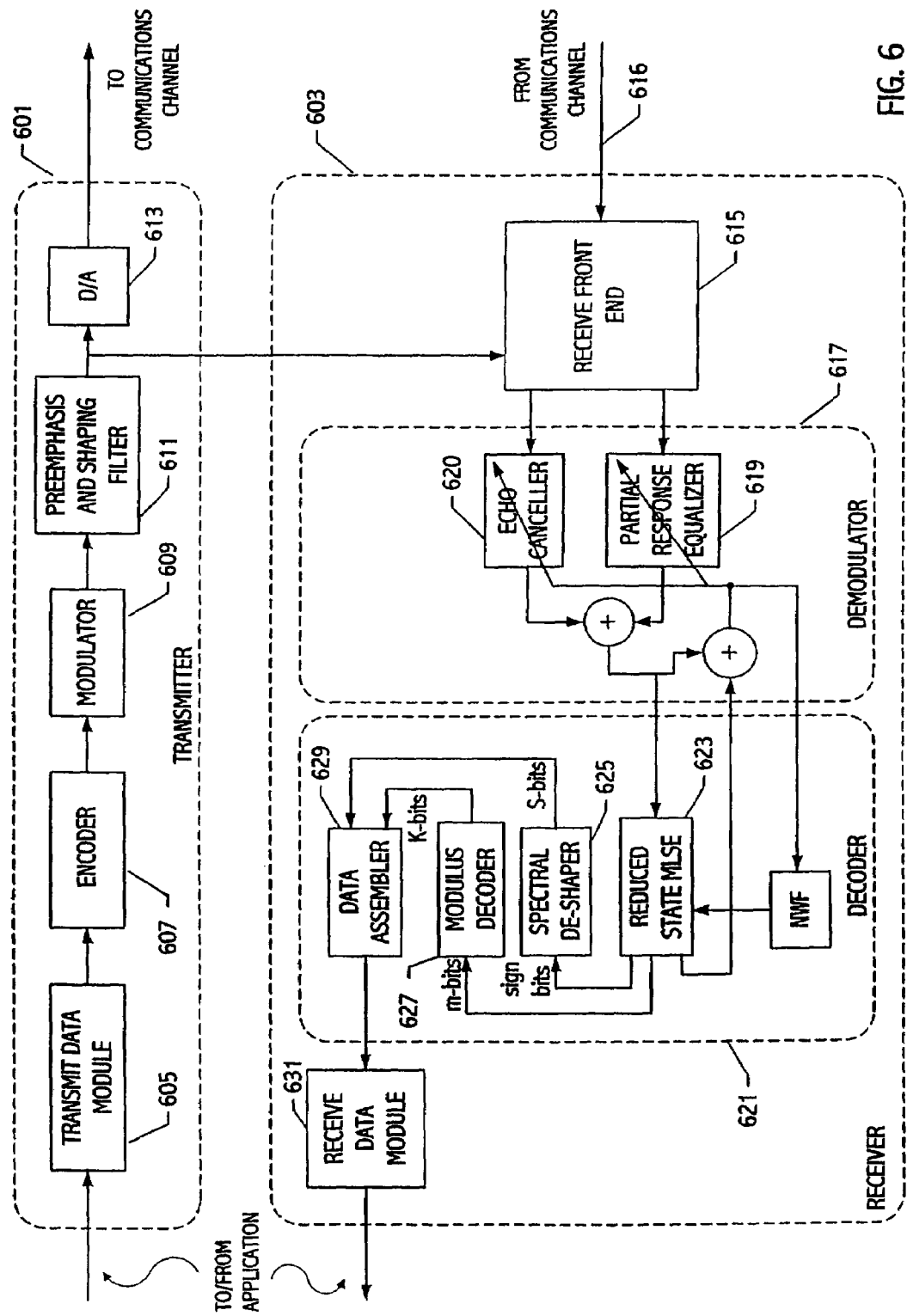
FIG. 6 depicts an exemplary V.90 modem realization in which Digital Impairment Learning (DIL) techniques in accordance with the present invention may be employed.
Figure 7:
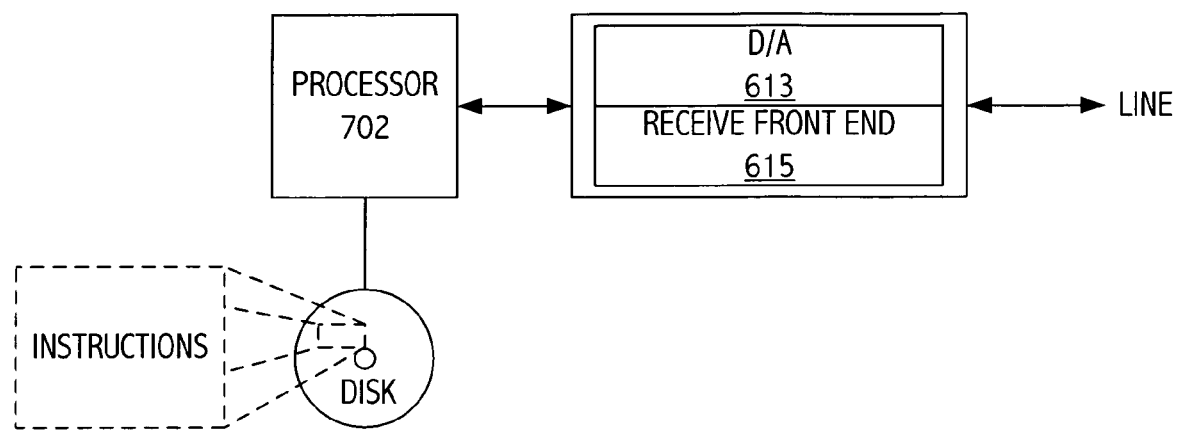
FIG. 7 depicts an exemplary V.90 modem realization in which Digital Impairment Learning (DIL) techniques in accordance with the present invention may be employed.

Referring illustratively to FIG. 6, an exemplary V.90 modem implementation employs a reduced state maximum likelihood sequence estimator and a partial response class V equalizer. A brief description of the illustrated modem will provide a context for better understanding some device embodiments in accordance with the present invention. A detailed discussion of the operation of the exemplary modem is omitted since modem operation in conformance with Recommendation V.90 is known the art. More detailed information may be found in the above-incorporated U.S. Patent Application and in Recommendation V.90. In an illustrative embodiment, partial response equalizer 619 is implemented in software that may be stored on computer readable media that can be executed on a suitable processor. Those of skill in the art will appreciate that the teachings herein may be applied to a variety of modem and communication device implementations (see, for example, FIG. 7) including those employing a programmable digital signal processor (e.g., processor 702) and/or specialized logic.

The illustrated modem includes both transmitter 601 and receiver 603 portions. In general, DIL descriptor information is supplied using transmitter portion 601, while a corresponding DIL sequence is received using receiver portion 603. Constellations selected as described herein are communicated using transmitter portion 601. Transmitter data module 605 supplies a digital bit stream to encoder 607. Transmitter data module 605 may generate such digital data locally in the case of startup or training (including DIL descriptor supply) or may fetch or receive data from an external data source or application program (not shown) in data mode. Transmitter data module 605 passes the data to the encoder 607, which in turn converts the input bit stream into a sequence of symbols that are then provided to modulator 609. Modulator 609 performs appropriate sampling and filtering operations and provides its output to shaping and preemphasis filter 611, which in turn provides square-root-of raised cosine shaping as well as preemphasis filtering as specified by Recommendation V.90. Note that during certain phases of modem operation, including supply of a DIL descriptor, spectral shaping is disabled. The resultant modulated, encoded signal is supplied to a communications channel (not shown) by digital-to-analog converter 613.

Receiver portion 603 of the illustrated modem receives the output from the transmitter (prior to the D/A) into receiver front end 615. Receiver front end also receives a received signal 616 from the communications channel. Receiver front end 615 performs operations such as analog-to-digital conversion on the received signal, various filtering and echo-canceling operations and provides its output to demodulator 617. Demodulator 617 includes partial response class V equalizer 619. Accordingly, DIL sequences organized as described above for PRV equalizers are suitable for supply to the illustrated modem and characteristic group determinations and impairment sensitive selection of constellation points based on the equalized DIL sequences may be employed. In the illustration of FIG. 6, demodulator 617 also includes a second stage near-end echo canceller 620, which cancels the echo at the output of the equalizer and is intended to track slow variations of the echo signal. The output of the partial response equalizer is provided to decoder 621, and more specifically to reduced state maximum likelihood sequence estimator 623 thereof.

In data mode, symbols decoded by maximum likelihood sequence estimator 623 are split into sign and amplitude components and passed respectively to the spectral deshaper 625 and modulus decoder 627. These modules extract the data payload from the symbols that is later converted to a bit stream by data assembler 629. Receive data module 631 descrambles the bit stream and, in general, passes it to an application program (not shown).

For DIL operations described herein, amplitude estimates are, in general, processed at the equalizer output although other points in the signal flow of FIG. 6 may also be suitable. In particular, based on such amplitude estimates, the illustrated modem assigns each phase of the received sequence to a characteristic group as described in greater detail above. Similarly, constellation points are selected for each characteristic group of phases as described in greater detail above. Constellation point selections are transmitted to a remote modem (not shown) using transmitter portion 601 in accordance with the "Phase 4—Final training" protocol of Recommendation V.90.

In general, techniques described herein support improved impairment compensation sequences, methods and signal processing configurations. In some realizations, improved digital impairment learning in accordance with Recommendation V.90 is provided. Based on the description herein, persons of ordinary skill in the art will appreciate a variety of applications of the underlying techniques and the breadth of the invention. Without limitation thereto, a V.90 modem configuration provides a useful example. Some of the exemplary embodiments have been described in a largely software context to provide clarity to the invention. While such software implementations of the invention are certainly contemplated, the teachings disclosed herein may also be used by persons of ordinary skill in the art to implement the present invention in a hardware or mixed hardware/software context without departing from the scope of the invention.

What is claimed is:

1. A method for selecting points for inclusion in a multipoint constellation, the method comprising:
   grouping phase intervals into groups based on similarity of an aggregate impairment exhibited therein and calculating a characteristic set of one or more symbol estimates of one or more of the phase intervals for each of the groups; and
   assigning constellation points for a current constellation index corresponding to a plurality of phase intervals, based on one or more characteristic sets corresponding thereto, wherein one or more characteristic sets include contributions of symbol estimates from the phase intervals associated with one or more constellation indices other than the current constellation index.

2. A method, as recited in claim 1, further comprising: performing the assigning collectively for each of J distinct constellation indices, where J>O, wherein the assigning includes:
   selecting, for each of the J distinct constellation indices, successive candidate next constellation points that, based on the symbol estimates for the one or more characteristic sets corresponding to the current constellation index, satisfy a distance metric with respect to a last assigned constellation point for the current constellation index; and
   assigning successive lowest power ones of the candidate next constellation points to respective ones of the J distinct constellation indices.

3. A method, as recited in claim 1, wherein each of the phase intervals corresponding to the current constellation index is a member of a same group; and
   wherein the assigning further includes selecting a next constellation point such that a distance metric between a group-characteristic estimate thereof and a last selected constellation point for the current constellation index satisfies a minimum distance criterion.

4. A method as recited in claim 1, wherein at least two phase intervals corresponding to the current constellation index are members of different groups; and
   wherein the assigning further includes selecting a next constellation point such that a distance metric between group-characteristic estimates thereof and a last selected constellation point for the constellation index satisfies a minimum distance criterion for the at least two phase intervals.

5. A method, as recited in claim 1, wherein the current constellation index is a $k^{th}$ one of six constellation indices, where $k \geq 0$; and
   wherein a $k^{th}$ one of the phase intervals, a $(k+6)^{th}$ one of the phase intervals, a $(k+12)^{th}$ one of the phase intervals and a $(k+18)^{th}$ one of the phase intervals each correspond to the constellation index.

6. A method, as recited in claim 1, wherein multiple phase intervals correspond to the current constellation index.

7. A method, as recited in claim 1, wherein a single phase interval corresponds to the current constellation index.

8. A method, as recited in claim 1, wherein the phase intervals number twenty-four; and wherein the current constellation index is one of six constellation indices.

9. A method, as recited in claim 1, further comprising:
   performing the grouping based on a received impairment compensation sequence that places at least one instance of each symbol from a predetermined set of symbols in each of the phase intervals.

10. A method, as recited in claim 1, further comprising:
    communicating the constellation points to a remote communications device.

11. A method, as recited in claim 1, wherein the symbol estimates include amplitude estimates of pulse code modulation codewords.

12. A method, as recited in claim 1, wherein the distance metric includes a set difference measure based on respective amplitude estimates corresponding to representation groupings of pulse code modulation codewords.

13. In a communications system for communicating via a channel susceptible to one or more potential impairments each periodic in an integer N samples of a received signal, where N>1, a method for mapping constellation points to one or more constellations, the method comprising:
    receiving a sequence of symbol estimates organized into N phases, a respective plurality of the phases corresponding to a particular one of J constellation indices where J>0;
    grouping the N phases into a set of characteristic groups according to aggregate effects of the periodic impairments, if any, present in the N phases and without a priori identification of individual forms of the periodic impairments present therein; and for the particular one of J constellation indices, selecting the constellation points based on one or more of the characteristic groups, the one or more of the characteristic groups being associated with the respective plurality of the phases.

14. A method, as recited in claim 13, wherein the selecting includes, for each of the J constellation indices, selecting successive candidate next constellation points that, based on the characteristic groups associated with the respective plurality of the phases, satisfy a distance metric with respect to a last assigned constellation point for the particular one of J constellation indices; and assigning successive lowest power ones of the candidate next constellation points to respective constellation indices.

15. A method, as recited in claim 13, wherein the selecting of the constellation points for the particular one of J constellation indices includes:

calculating, for each associated characteristic group, a distance metric between a constellation point last added to the particular one of J constellation indices and estimates of a plurality of next lowest power constellation points; and selecting for addition for the particular one of J constellation indices, one of the next lowest power constellation points for which the calculated distance metric exceeds a minimum distance metric for each associated characteristic group.

16. A method, as recited in claim 13, wherein the selecting of the constellation points for the particular one of J constellation indices includes:

for each associated one of the characteristic groups, finding a next lowest power constellation point for which a distance metric between an estimate of the next lowest power constellation point and a constellation point last added to the particular one of J constellation indices exceeds a minimum distance metric; and adding for the particular one of J constellation indices, a highest power one of the next lowest power constellation points associated with the characteristic groups.

17. A method, as recited in claim 13, wherein each of the N phases corresponding to a $j^{th}$ constellation index is associated with a single characteristic group where $j \geq 0$ and wherein selecting for a particular constellation corresponding to the $j^{th}$ constellation index includes selecting for addition to the particular constellation, a next lowest power constellation point for which a distance metric between a constellation point last added to the particular constellation and an estimate of the next lowest power constellation point exceeds a minimum distance metric.

18. A method, as recited in claim 13, wherein N is 24.

19. A method, as recited in claim 13, wherein J is 6.

20. A communication device for communicating, using one or more constellations, via a channel susceptible to one or more potential impairments each periodic in an integer N samples of a received signal, the communications device comprising:

a receive path for receiving from the channel a sequence of symbols organized into N phase intervals, wherein a respective plurality of the phase intervals correspond to a particular one of J constellation indices where J>0; and an impairment compensator coupled into the receive path during a training mode to receive the sequence of symbols and group the N phase intervals thereof into a set of characteristic groups according to aggregate effects of the periodic impairments, if any, the impairment compensator selecting, for the particular one of the J constellation indices, constellation points based on one or more of the characteristic groups, the one or more of the characteristic groups being associated with the respective plurality of the phase intervals corresponding thereto.

21. The communication device of claim 20 wherein the one or more of the characteristic groups associated with the respective plurality of the phase intervals corresponding to the at least one of the J constellation indices include contributions of symbol receptions of the sequence of symbols in grouped phase intervals corresponding to other constellation indices, such that selection of constellation points for the particular one of the J constellation indices is improved by symbol receptions from substantially all phase intervals exhibiting similar aggregate effects of the periodic impairments.

22. The communication device of claim 20, further comprising:

a transmit path, wherein the impairment compensator is coupled to the transmit path to supply an encoding of the constellation points selected by the impairment compensator to a remote communications device.

23. The communication device of claim 20, wherein for a particular received sequence, respective phase intervals corresponding to two or more indistinct ones of the J constellation indices are identically grouped; and distinct ones of the J constellation indices number J.

24. The communication device of claim 20, wherein N is 24 and J is 6.

25. An apparatus comprising:

means for organizing a received sequence of symbol estimates into N phases where N is an integer greater than 1;

means for grouping the N phases into a set of characteristic groups according to correspondence of aggregate effects of periodic impairments, if any, present in the N phases; and means for selecting constellation points for a constellation index corresponding to a plurality of the N phases using one or more of the received symbol estimates characteristic of one or more of the set of characteristic groups associated with the plurality of the N phases.

26. The apparatus of claim 25 wherein the means for selecting constellation points using one or more of the received symbol estimates characteristic of the one or more of the set of characteristic groups associated with the plurality of the N phases includes:

means for selecting candidate next constellation points for each of J distinct constellation indices, where J>0; and means for assigning successive lowest power ones of the candidate next constellation points to respective constellations.

27. A computer program stored on a computer readable medium comprising:

instructions executable on at least one processor to at least partially implement a communications device; and said instructions including an impairment compensation subset thereof executable to group N phases of a symbol sequence received by the communications device into a set of characteristic groups according to correspondence of aggregate effects of periodic impairments, if any, present in the N phases, where N is an integer greater than 1, the impairment compensation subset of instructions selecting constellation points for a constellation index corresponding to a plurality of the N phases using one or more symbol estimates characteristic of the one or more characteristic groups associated with the plurality of the N phases.

28. A computer program stored on a computer readable medium as in claim 27 wherein the instructions are encoded by or transmitted in at least one computer readable medium selected from the set of a disk, tape or other magnetic, optical, or electronic storage medium and a network, wireline, wireless or other communications medium.

29. The communication device of claim 20 further comprising a partial response class V (PRV) equalizer coupled in the receive path.

30. The method as recited in claim 9 further comprising using a partial response class V (PRV) equalizer on the received impairment compensation sequence.

31. The method of claim 13, wherein each of the characteristic groups exhibits a different impairment characteristic.

32. The method of claim 13, wherein the selecting of the constellation points includes identifying a symbol code for which symbol amplitude estimates from each of a plurality of the characteristic groups associated with the plurality of the phases exceed a symbol estimate associated with a last assigned constellation point.

33. The method of claim 13, wherein the plurality of the phases are timing phases, and each of the timing phases includes a symbol associated with an amplitude level.

34. The apparatus of claim 25, wherein each of the characteristic groups exhibits a different impairment characteristic.

35. The apparatus of claim 25, wherein the means for selecting constellation points includes means for identifying a symbol code for which symbol amplitude estimates from each of a plurality of the characteristic groups associated with the plurality of the N phases exceed a symbol estimate associated with a last assigned constellation point.

36. The method of claim 13, wherein the plurality of the phases are timing phases, and each of the timing phases includes a symbol associated with an amplitude level.

* * * * *